US008814975B2

(12) United States Patent
Kikuchi

(10) Patent No.: US 8,814,975 B2
(45) Date of Patent: Aug. 26, 2014

(54) HONEYCOMB STRUCTURE AND MANUFACTURING METHOD OF THE SAME

(75) Inventor: Yoshio Kikuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/424,722

(22) Filed: Mar. 20, 2012

(65) Prior Publication Data

US 2012/0240542 A1    Sep. 27, 2012

(30) Foreign Application Priority Data

Mar. 24, 2011   (JP) .................................. 2011-066549

(51) Int. Cl.
| | |
|---|---|
| B01D 50/00 | (2006.01) |
| B01D 24/00 | (2006.01) |
| B01D 39/14 | (2006.01) |
| B01D 39/20 | (2006.01) |
| B01D 39/06 | (2006.01) |
| C04B 38/00 | (2006.01) |
| B28B 11/00 | (2006.01) |
| B01D 46/24 | (2006.01) |
| C04B 111/00 | (2006.01) |

(52) U.S. Cl.
CPC .......... B28B 11/006 (2013.01); C04B 38/0009 (2013.01); *B01D 46/2429* (2013.01); *C04B 2111/00413* (2013.01); *C04B 2111/00793* (2013.01); *B01D 2046/2437* (2013.01)
USPC ................ 55/523; 55/522; 55/524; 422/169; 422/170; 422/171; 422/172; 422/177; 422/178; 422/179; 422/180; 422/181; 422/182

(58) Field of Classification Search
CPC .............. C04B 35/195; C04B 38/0006; C04B 41/0009; C04B 35/00; C04B 38/0009; C04B 35/565; C04B 38/0074; B01D 53/228; Y02T 10/20; F01N 3/0222
USPC ............ 55/522–524; 422/169–172, 177–182
See application file for complete search history.

(56) References Cited

U.S. PATENT DOCUMENTS 4,719,058 A    1/1988   Komoda
6,479,099 B1   11/2002  Takahashi et al.
(Continued)

FOREIGN PATENT DOCUMENTS

EP    2 174 701 A1   4/2010
EP    2 502 663 A1   9/2012
(Continued)

OTHER PUBLICATIONS

Neya et al., English Translation of "Coating Material for Forming Porous Filmn and Porous Film, Ceramic Filter, Exhaust Gas Purifying Filter and Method for Manufacturing Ceramic Filter", Apr. 30, 2010, Japan.*

(Continued)

*Primary Examiner* — Amber Orlando
(74) *Attorney, Agent, or Firm* — Burr & Brown, PLLC

(57) ABSTRACT

There is provided a honeycomb structure including a honeycomb base material including a porous partition wall parent material; plugged portions; and a porous collecting layer disposed on the surface of the partition wall parent material in the remaining cells. A melting point of a material constituting the collecting layer is higher than that of a material constituting the partition wall parent material, a pore surface area per unit volume of the collecting layer is 2.0 times or more a pore surface area per unit volume of the partition wall parent material, and a thickness of a portion of the collecting layer which penetrates into pores of the partition wall parent material is 6% or smaller of that of each of partition walls including the partition wall parent material and the collecting layer.

8 Claims, 10 Drawing Sheets

(56) References Cited

U.S. PATENT DOCUMENTS

| | | |
|---|---|---|
| 6,509,060 B1 | 1/2003 | Komoda et al. |
| 2002/0178707 A1 | 12/2002 | Vance et al. |
| 2010/0135866 A1 | 6/2010 | Mizuno et al. |
| 2012/0070346 A1 | 3/2012 | Mizutani et al. |

FOREIGN PATENT DOCUMENTS

| | | |
|---|---|---|
| JP | 63-066566 B2 | 12/1988 |
| JP | 01-274815 A1 | 11/1989 |
| JP | 2000-288324 A1 | 10/2000 |
| JP | 2004-532145 A | 10/2004 |
| JP | 2010-095399 A1 | 4/2010 |
| WO | 2008/136232 A1 | 11/2008 |
| WO | 2011/149744 A1 | 12/2011 |

OTHER PUBLICATIONS

U.S. Appl. No. 13/416,299, filed Mar. 9, 2012, Isoda et al.
U.S. Appl. No. 13/420,774, filed Mar. 15, 2012, Isoda et al.
U.S. Appl. No. 13/424,764, filed Mar. 20, 2012, Kikuchi et al.
Yukio Mizuno et al., *"Study on Wall Pore Structure for Next Generation Diesel Particulate Filter,"* SAE Technical Paper 2008-01-0618, Society of Automotive Engineers, 2008, pp. 289-298.
E. Ohara et al., *"Filtration Behavior of Diesel Particulate Filters (1),"* SAE Technical Paper 2007-01-0921, Society of Automotive Engineers, 2007, pp. 261-272.
Extended European Search Report dated Jan. 2, 2013.

\* cited by examiner

HONEYCOMB STRUCTURE AND MANUFACTURING METHOD OF THE SAME

BACKGROUND OF THE INVENTION

1. Field of the Invention

The present invention relates to a honeycomb structure and a manufacturing method of the honeycomb structure. More particularly, it relates to a honeycomb structure which can suppress the increase of an initial pressure loss and has a high initial collecting efficiency of a particulate matter, and a manufacturing method of a honeycomb structure which can manufacture such a honeycomb structure.

2. Description of Related Art

In gases discharged from internal combustion engines such as diesel engines, various types of combustion apparatuses and the like, a large amount of particulate matter (PM) mainly composed of soot is included. When this PM is discharged as it is to the atmosphere, environmental pollutions are caused. Therefore, a diesel particulate filter (DPF) for collecting the PM is mounted on an exhaust system of an exhaust gas.

As such a DPF, there has been used, for example, a honeycomb structure "including porous partition walls to partition and form a plurality of cells which become through channels of a fluid (an exhaust gas and a purified gas) and an outer peripheral wall positioned in an outermost periphery, and further including plugged portions in open frontal areas of predetermined cells in an end surface on an inflow side of the fluid (the exhaust gas) and open frontal areas of the remaining cells in an end surface on an outflow side of the fluid (the purified gas)".

There has been a problem that when the PM in the exhaust gas is collected by using such a honeycomb structure, the PM penetrates into the porous partition walls to clog pores of the partition walls, and a pressure loss rapidly increases sometimes.

A filter has been suggested in which to suppress the increase of a pressure loss, a collecting layer for collecting a PM is disposed on the surfaces of partition walls, and the collecting layer prevents the penetration of the PM into the partition walls, to suppress the rise of the pressure loss (e.g., see Non-Patent Document 1).

Heretofore, as a regulation on an automobile exhaust gas, the regulation by means of a mass of the PM has been performed. In recent years, however, the introduction of the regulation on the number of the PMs has been investigated. In this case, it is necessary to securely collect the PM having small particle diameters. It is known that the PM having the small particle diameters is collected by the surfaces of pores which are present in a filter, mainly by diffusion (e.g., see Non-Patent Document 2).

Heretofore, when the honeycomb structure including the collecting layer is prepared, the collecting layer has been formed by immersing the honeycomb structure into a collecting layer forming slurry (a collecting layer forming raw material) or pouring the collecting layer forming slurry into cells of the honeycomb structure, to coat porous partition walls (a partition wall parent material) with the collecting layer forming slurry, followed by firing. Moreover, when a porous film having smaller pore diameters and smaller thickness than the porous partition walls is formed on the surfaces of the partition walls, it has been necessary to set the particle diameters of ceramic particles constituting the porous film to be smaller than the pore diameters of the partition walls. However, in this method, there has been a problem that the collecting layer forming slurry penetrates into the pores of the partition walls (the partition wall parent material) of the honeycomb structure, and an initial pressure loss in the case of the circulation of the exhaust gas through the obtained honeycomb structure becomes high.

Furthermore, in the case of a honeycomb structure made of cordierite, aluminum titanate or the like, there has been a problem that a slurry penetrates into micro cracks formed in the honeycomb structure or the like, and a thermal expansion coefficient or the like of the obtained honeycomb structure or the like becomes high.

On the other hand, a method has been suggested in which pores of a porous support material are charged with "a substance which can be removed later", the pores are clogged, and then the surface of the porous support material is coated with a slurry including ceramic particles having small particle diameters (e.g., see Patent Documents 1 to 3). Examples of "the substance which can be removed later" can include combustible substances (Patent Document 1). When the combustible substances, are used, the combustible substances can be burnt and removed later in a firing step. Moreover, examples of "the substance which can be removed later" can include water and alcohol (Patent Documents 2 and 3). When the water or alcohol is used, the surface is coated with the slurry and then dried, whereby the water or alcohol can be removed.

Moreover, a method has been suggested in which a ceramic porous film (a collecting layer) is formed on the surface of a porous support material by use of fine particles mainly composed of an oxide such as alumina or zirconia (e.g., see Patent Document 4). Specifically in the method, the ceramic porous film is formed on the surface of the porous support material made of a porous ceramic by use of a porous film forming coating material containing the fine particles mainly composed of the oxide having controlled average primary particle diameter, tap bulk density and average secondary particle diameter in the coating material (the average secondary particle diameter when the material is dispersed in a dispersion medium), and containing the dispersion medium mainly composed of water. A viscosity of the material is controlled to be 2 mPa·s or larger and 1000 mPa·s or smaller.

Furthermore, a method has been suggested in which a collecting layer forming slurry prepared by further adding a pore former and water to the same material as that of a honeycomb formed body is sprayed on the honeycomb formed body, to deposit the collecting layer forming slurry on partition walls of the honeycomb formed body, followed by drying and firing, thereby disposing the collecting layer on the honeycomb formed body (e.g., see Patent Document 5).

In addition, a method has been suggested in which a slurry made of a bonding material mainly composed of an inorganic fibrous material longer than pore diameters of porous partition walls and silica or alumina is deposited on the surfaces of the partition walls, followed by drying and firing, thereby forming a porous film (a collecting layer) on surface layers of the partition walls (e.g., see Patent Document 5).

[Patent Document 1] JP-A-1-274815
[Patent Document 2] JP-B-63-66566
[Patent Document 3] JP-A-2000-288324
[Patent Document 4] JP-A-2010-95399
[Patent Document 5] WO2008/136232
[Non-Patent Document 1] SAE Technical Paper 2008-01-0618, Society of Automotive Engineers (2008)
[Non-Patent Document 2] SAE Technical Paper 2007-01-0921, Society of Automotive Engineers (2007)

SUMMARY OF THE INVENTION

In the manufacturing methods disclosed in Patent Documents 1 to 4, the collecting layer forming slurry does not easily penetrate into pores of a porous support material (partition walls), but it has been difficult to securely suppress an amount of the penetration.

An inorganic fiber material used in the manufacturing method disclosed in Patent Document 5 is an object substance of laws and regulations depending upon the district, and it has been desired that the material is not usually used.

In the manufacturing method disclosed in Patent Document 5, a material of partition walls (a partition wall parent material) of a honeycomb structure is the same as that of a collecting layer. Therefore, at the time of firing, the partition wall parent material and the collecting layer are sintered at the same temperature, and pores of the collecting layer become small sometimes. Moreover, when a slurry is sprayed and deposited on the partition wall parent material, it tends to be difficult to form the collecting layer having an even thickness, as compared with a case where the partition wall parent material is dip-coated with the slurry.

The present invention has been developed in view of the above problems, and an object thereof is to provide a honeycomb structure which can suppress the increase of an initial pressure loss and has a high initial collecting efficiency of a particulate matter, and a manufacturing method of a honeycomb structure which can manufacture such a honeycomb structure.

[1] A honeycomb structure comprising: a honeycomb base material including a porous partition wall parent material to partition and form a plurality of cells which become through channels of a fluid; plugged portions arranged in open frontal areas of predetermined cells in an end surface on an inflow side of the fluid and open frontal areas of the remaining cells in an end surface on an outflow side of the fluid; and a porous collecting layer disposed on the surface of the partition wall parent material in the remaining cells, wherein a melting point of a material constituting the collecting layer is higher than that of a material constituting the partition wall parent material, a pore surface area per unit volume of the collecting layer is 2.0 times or more a pore surface area per unit volume of the partition wall parent material, and a thickness of a portion of the collecting layer which penetrates into pores of the partition wall parent material is 6% or smaller of that of each of partition walls including the partition wall parent material and the collecting layer.

[2] The honeycomb structure according to [1], wherein the pore surface area per unit volume of the partition walls is from 1.4 to 20 $m^2/cm^3$.

[3] The honeycomb structure according to [1] or [2], wherein a porosity of a portion of the collecting layer which does not penetrate into the pores of the partition wall parent material is 60% or larger.

[4] The honeycomb structure according to any one of [1] to [3], wherein a thickness of the collecting layer is from 5 to 30% of that of the partition wall including the partition wall parent material and the collecting layer disposed on the partition wall parent material.

[5] The honeycomb structure according to any one of [1] to [4], wherein the partition wall parent material has an average pore diameter of 10 to 60 μm, and a porosity of 40 to 70%.

[6] The honeycomb structure according to any one of [1] to [5], wherein the material of the partition wall parent material is cordierite, and the material of the collecting layer includes at least one selected from the group consisting of alumina, mullite and spinel.

[7] A manufacturing method of a honeycomb structure, comprising: a forming step of forming a ceramic forming raw material containing a ceramic raw material, and forming a honeycomb formed body including a non-fired partition wall parent material to partition and form a plurality of cells which become through channels of a fluid; a first plugging step of arranging plugged portions in open frontal areas of the predetermined cells in an end surface of the honeycomb formed body on an inflow side of the fluid; a collecting layer forming raw material coating step of attaching, to the surface of the non-fired partition wall parent material in the remaining cells of the honeycomb formed body which are not provided with the plugged portions, a collecting layer forming raw material containing a ceramic raw material for the collecting layer which has a higher melting point than the ceramic raw material and an aqueous electrolyte solution having a concentration of 50 to 100% of a saturated solubility; a second plugging step of arranging plugged portions in open frontal areas of the remaining cells in an end surface of the honeycomb formed body on an outflow side of the fluid; and a firing step of firing the honeycomb formed body coated with the collecting layer forming raw material to prepare the honeycomb structure.

[8] The manufacturing method of the honeycomb structure according to [7], the honeycomb structure comprising: a honeycomb base material including a porous partition wall parent material to partition and form a plurality of cells which become through channels of a fluid; plugged portions arranged in open frontal areas of the predetermined cells in an end surface on an inflow side of the fluid and open frontal areas of the remaining cells in an end surface on an outflow side of the fluid; and a porous collecting layer disposed on the surface of the partition wall parent material in the remaining cells, wherein a melting point of a material constituting the collecting layer is higher than that of a material constituting the partition wall parent material, a pore surface area per unit volume of the collecting layer is 2.0 times or more a pore surface area per unit volume of the partition wall parent material, and a thickness of a portion of the collecting layer which penetrates into pores of the partition wall parent material is 6% or smaller of that of each of partition walls.

[9] The manufacturing method of the honeycomb structure according to [7] or [8], wherein the electrolyte includes at least one anion selected from the group consisting of a citrate ion, a tartrate ion, a sulfate ion, an acetate ion and a chloride ion, and at least one cation selected from the group consisting of an alkali earth metal ion, a hydrogen ion and an ammonium ion.

[10] The manufacturing method of the honeycomb structure according to any one of [7] to [9], wherein the collecting layer forming raw material contains a pore former, and a total volume of the ceramic raw material for the collecting layer and the pore former is from 5 to 30 vol % of the whole volume of the collecting layer forming raw material.

[11] The manufacturing method of the honeycomb structure according to any one of [7] to [10], wherein the collecting layer forming raw material contains, as a viscosity regulator, a surfactant and/or a micro organic fiber insoluble in water.

According to a honeycomb structure of the present invention, a pore surface area per unit volume of a collecting layer is 2.0 times or more a pore surface area per unit volume of a partition wall parent material, and a thickness of a portion of the collecting layer which penetrates into pores of the partition wall parent material is 6% or smaller of that of "each partition wall including the partition wall parent material and the collecting layer". Therefore, it is possible to raise an initial collecting efficiency and further to suppress the increase of an initial pressure loss.

A manufacturing method of a honeycomb structure of the present invention includes a collecting layer forming raw material coating step of attaching, to the surface of a non-fired partition wall parent material in the remaining cells of the honeycomb formed body, a collecting layer forming raw material containing "a ceramic raw material for the collecting layer which has a higher melting point than the ceramic raw material" and "an aqueous electrolyte solution having a concentration of 50 to 100% of a saturated solubility". Therefore, it is possible to prevent a collecting layer forming slurry from penetrating into the partition wall parent material of the honeycomb formed body, and it is possible to decrease the thickness of "a portion which penetrates into pores of the partition wall parent material" in the collecting layer of the obtained honeycomb structure.

DETAILED DESCRIPTION OF THE INVENTION

Hereinafter, embodiments of the present invention will specifically be described with reference to the drawings, but it should be understood that the present invention is not limited to the following embodiments and that the following embodiments to which changes, improvements and the like are suitably added on the basis of ordinary knowledge of a person skilled in the art without departing from the scope of the present invention also fall in the scope of the present invention.

Figure 1:
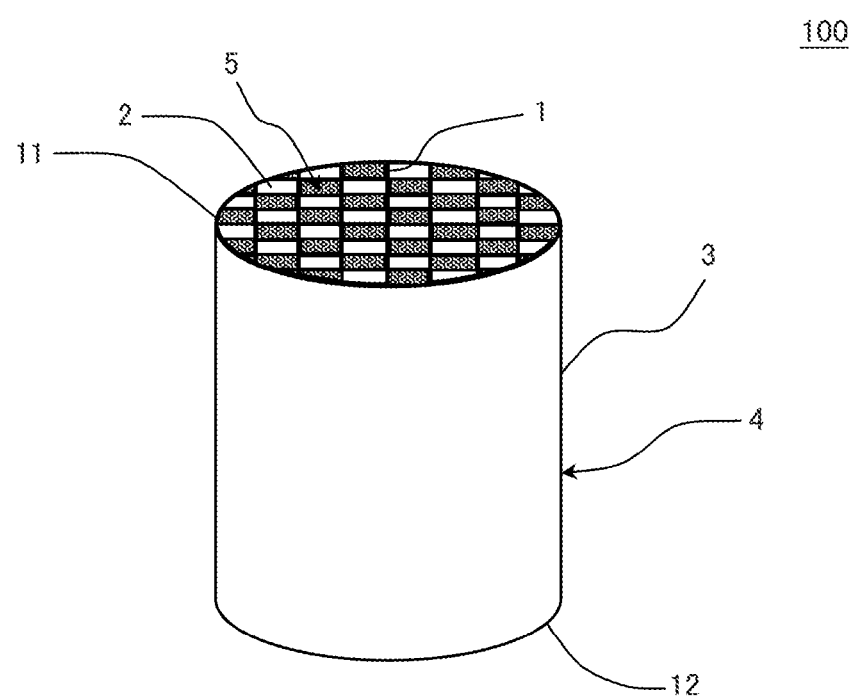
FIG. 1 is a perspective view schematically showing an embodiment of a honeycomb structure of the present invention.
Figure 2:
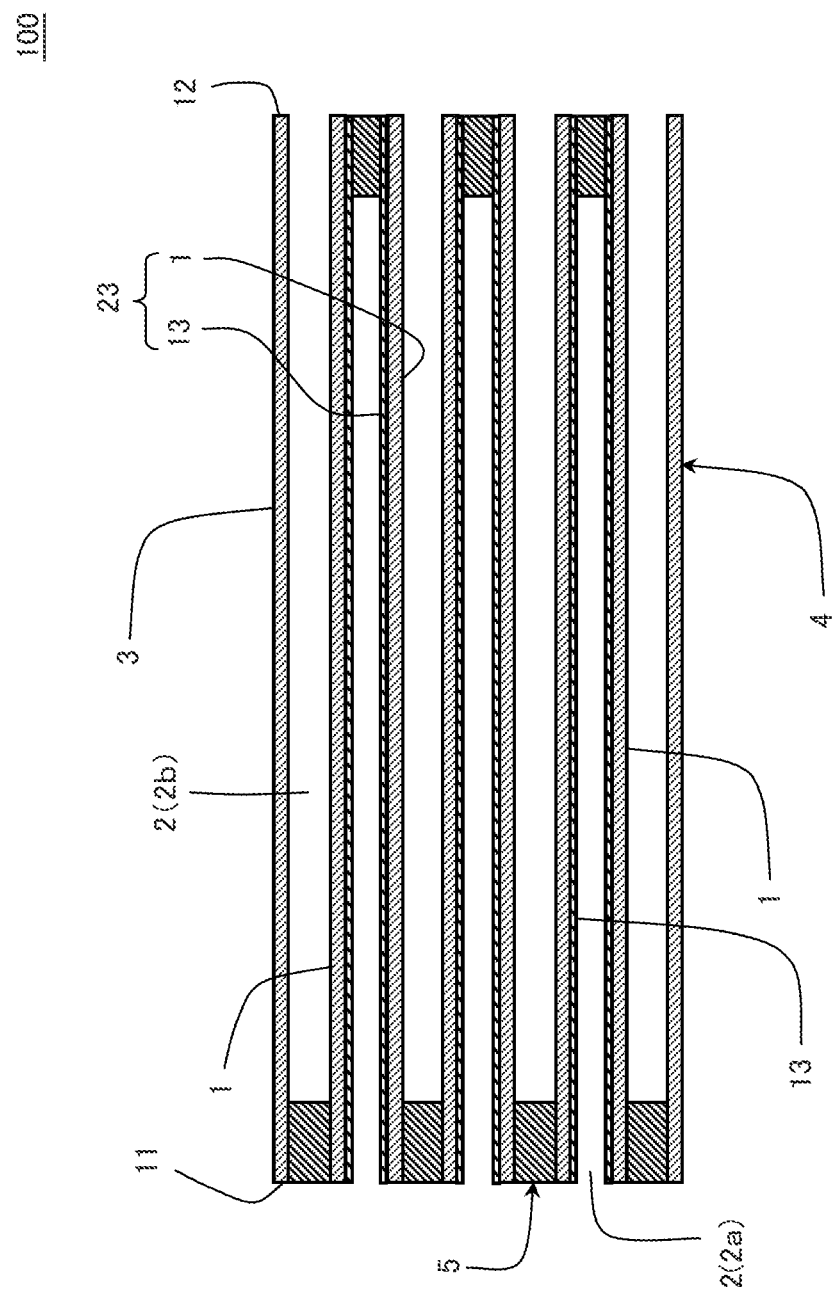
FIG. 2 is a schematic view showing a cross section of the embodiment of the honeycomb structure of the present invention which is parallel to a cell extending direction.

(1) Honeycomb Structure:

As shown in FIG. 1 and FIG. 2, an embodiment (a honeycomb structure 100) of a honeycomb structure of the present invention includes a honeycomb base material 4 having a porous partition wall parent material 1 to partition and form a plurality of cells 2 which become through channels of a fluid; plugged portions 5 arranged in open frontal areas of predetermined cells 2 (outflow cells 2b) in an end surface 11 on an inflow side of the fluid and open frontal areas of the remaining cells 2 (inflow cells 2a) in an end surface 12 on an outflow side of the fluid; and a porous collecting layer 13 disposed on the surface of the partition wall parent material 1 in the remaining cells 2 (the inflow cells 2a). A melting point of a material constituting the collecting layer 13 is higher than that of a material constituting the partition wall parent material 1. A pore surface area per unit volume of the collecting layer 13 is 2.0 times or more a pore surface area per unit volume of the partition wall parent material 1. A thickness of a portion of the collecting layer 13 which penetrates into pores of the partition wall parent material 1 is 6% or smaller of that of each of "partition walls 23 including the partition wall parent material 1 and the collecting layer 13". It is to be noted that the collecting layer 13 may be disposed on the surface of the partition wall parent material 1 in the outflow cells 2b. Moreover, "the end surface" of the honeycomb base material means a surface in which the cells are open. Moreover, partition walls 23 are formed by disposing the collecting layer 13 on the partition wall parent material 1. That is, a combination of the partition wall parent material 1 and the collecting layer 13 forms the partition walls 23. FIG. 1 is a perspective view schematically showing the embodiment of the honeycomb structure of the present invention. FIG. 2 is a schematic view showing a cross section parallel to a cell extending direction in the embodiment of the honeycomb structure of the present invention.

Thus, in the honeycomb structure 100 of the present embodiment, the pore surface area per unit volume of the collecting layer 13 is 2.0 times or more the pore surface area per unit volume of the partition wall parent material 1, and the thickness of the portion of the collecting layer 13 which penetrates into the pores of the partition wall parent material 1 is 6% or smaller of that of each of the partition walls 23. Therefore, it is possible to raise an initial collecting efficiency, and it is further possible to suppress the increase of an initial pressure loss.

In the honeycomb structure 100 of the present embodiment, the melting point of the material constituting the collecting layer 13 is higher than that of the material constituting the partition wall parent material 1, and the melting point of the material constituting the collecting layer 13 is preferably 300 to 700° C. higher than that of the material constituting the partition wall parent material 1. Since the melting point of the material constituting the collecting layer 13 is higher than that of the material constituting the partition wall parent material 1, the raw material of the collecting layer does not melt, when the partition wall parent material and the collecting layer are formed by performing firing in a process of manufacturing the honeycomb structure. It is possible to prevent the pore surface area per unit volume of the collecting layer from becoming small.

In the honeycomb structure 100 of the present embodiment, the pore surface area per unit volume of the collecting layer 13 is 2.0 times or more, preferably from 9 to 50 times, and further preferably from 30 to 50 times the pore surface area per unit volume of the partition wall parent material 1. Since the pore surface area per unit volume of the collecting layer 13 is 2.0 times or more the pore surface area per unit volume of the partition wall parent material 1, it is possible to raise the PM initial collecting efficiency. Here, "the pore surface area" means an area of a wall surface in each pore (the surface of the partition wall exposed in the pore). Moreover, "the pore surface area per unit volume" means a total value of "the pore surface areas" of all the pores present in the unit volume. A method of measuring "the pore surface area per unit volume" is as follows. The honeycomb structure 100 is buried in a resin (an epoxy resin) to fill the pores of the partition walls of the honeycomb structure 100 with the resin, thereby acquiring a scanning type electron microscope (SEM) image of a cross section of the honeycomb structure in a vertical direction to a cell longitudinal direction. A partition wall in the obtained SEM image is divided by a width of 5 μm from a partition wall center (the center in a thickness direction) to a surface layer in the image (by image analysis), and each "divided part (divided region)" is subjected to the following processing. A peripheral length of the surface of each partition wall and an area of each partition wall of each divided part are measured by using image analysis software (Image-Pro Plus 6.2J manufactured by Media Cybernetics Co.). "The peripheral length/the area" is the pore surface area per unit volume. Here, "the peripheral length" is a length obtained by distinguishing a portion where the material is present and a portion (the pore) where the material is not present in each "divided part", and adding up all the lengths of boundary lines between the portions where the material is present and the pores. The pore surface area per unit volume of the divided part closest to the surface is the pore surface area per unit volume of the collecting layer 13, and the pore surface area per unit volume of the divided part of the partition wall center is the pore surface area per unit volume of the partition wall parent material 1.

In the honeycomb structure 100 of the present embodiment, the thickness of the portion (a deep layer 22 (see FIG. 3)) of the collecting layer 13 which penetrates into pores of the partition wall parent material 1 is 6% or smaller, preferably 3% or smaller, and further preferably 1% or smaller of the thickness of each of the partition walls 23. Thus, since the thickness of the deep layer 22 (see FIG. 3) is 6% or smaller of that of the partition wall 23, it is possible to suppress the increase of the initial pressure loss. The thickness of the deep layer 22 (see FIG. 3) is preferably smaller, but a lower limit value is about 0.1%. The thickness of the partition wall 23 is a value measured by the scanning type electron microscope (SEM) image of the partition wall cross section.

Figure 3:
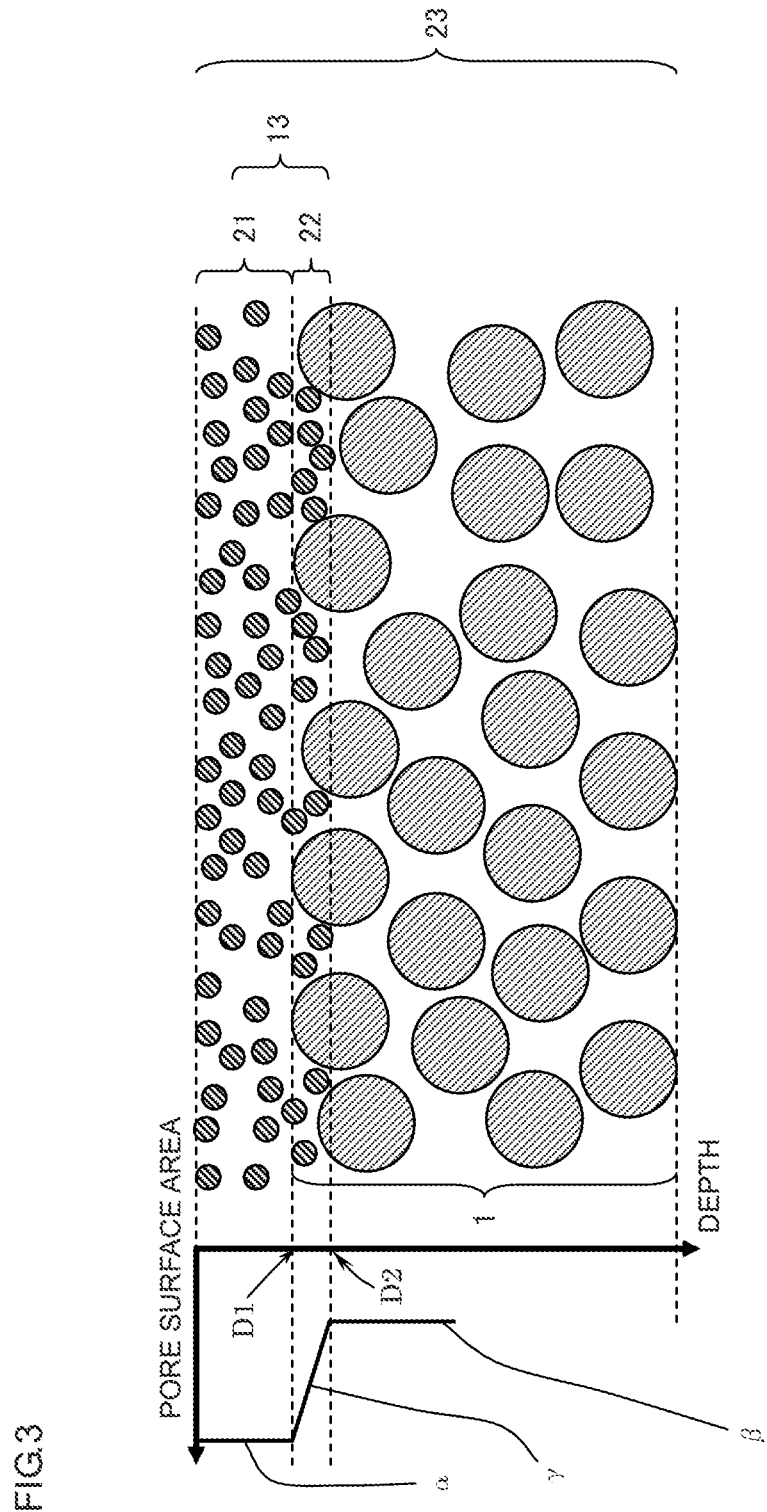
FIG. 3 is an enlarged schematic view showing a cross section of a partition wall in the embodiment of the honeycomb structure of the present invention.

In the honeycomb structure 100 of the present embodiment, as shown in FIG. 3, the partition wall 23 is constituted of the partition wall parent material 1 and the collecting layer 13. Moreover, the collecting layer 13 is constituted of a surface layer 21 positioned on an outer side from the surface of the partition wall parent material 1, and the deep layer 22 positioned on an inner side (inside the pores) from the surface of the partition wall parent material 1. FIG. 3 is an enlarged schematic view of a cross section of the partition wall 23 in the embodiment of the honeycomb structure of the present invention. Moreover, in FIG. 3, a graph shown beside the partition wall 23 (on the left side of a sheet surface) is a graph (a depth-pore surface area graph) in which the ordinate indicates "the pore surface area" and the abscissa indicates "a depth from the surface of the partition wall (the surface of the collecting layer which is exposed on a cell side". "The depth-pore surface area graph" shown in FIG. 3 indicates that the pore surface area of the surface layer 21 of the collecting layer 13 is largest, the pore surface area of a region where only the partition wall parent material 1 is present is smallest, and the pore surface area gradually becomes small from a position where a portion in which the deep layer 22 of the collecting layer 13 is present (the portion in which the deep layer 22 and the partition wall parent material 1 are mixed) comes in contact with the surface layer 21 to a region (the position) where the only partition wall parent material 1 is present. It is to be noted that the pore surface area shown in FIG. 3 is the pore surface area per unit volume.

A method of specifying "a boundary portion between the surface layer 21 of the collecting layer 13 and the deep layer 22 of the collecting layer 13" and "a boundary portion between the region where the deep layer 22 of the collecting layer 13 and the partition wall parent material 1 are mixed and the region where only the partition wall parent material 1 is present" in the partition wall 23 is as follows. A part between the center of the partition wall (the center in the thickness direction) and the surface of the collecting layer is divided by a width of 5 μm, and the pore surface area per unit volume of each "divided part (divided region)" is measured. "The dividing" of the partition wall is preferably performed by the image analysis. In this case, the pore surface area is preferably obtained by the scanning type electron microscope (SEM) image. The pore surface area of the divided part of the surface layer 21 (the region where the partition wall parent material 1 is not present) of the collecting layer 13 which is closest to the surface is the pore surface area of the surface layer 21. The pore surface area of the divided part closest to the center of the partition wall is the pore surface area of the region where the only partition wall parent material 1 is present (the pore surface area of the partition wall parent material 1). Moreover, in the "depth-pore surface area" coordinate shown in FIG. 3, a straight line α indicating that a value of a "pore surface area" axis (y-axis) is a value of "the pore surface area of the surface layer 21" and a straight line β indicating that the value of the "pore surface area" axis (y-axis) is a value of "the pore surface area of the region where the only partition wall parent material 1 is present" are drawn in parallel with a "depth" axis (x-axis) , respectively. Furthermore, "measured values of the pore surface areas" of the plurality of "divided parts" in the region where the deep layer 22 and the partition wall parent material 1 are mixed are linearly approximated (a minimum square process), to draw a straight line γ in a "depth-pore surface area" coordinate system. Then, "a value of a depth axis (x-axis)" of an intersection between the line α indicating the above "pore surface area of the surface layer 21" and the line γ indicating "the pore surface area of a portion where the deep layer 22 and the partition wall parent material 1 are mixed" is a depth D1 of "a boundary portion between the surface layer 21 of the collecting layer 13 and the deep layer 22 of the collecting layer 13". "A value of the depth axis (x-axis)" of an intersection between the line β indicating the above "pore surface area of the region where the only partition wall parent material 1 is present" and the line γ indicating "the pore surface area of the portion where the deep layer 22 and the partition wall parent material 1 are mixed" is a depth D2 of "a boundary portion between the region where the deep layer 22 of the collecting layer 13 and the partition wall parent material 1 are mixed and the region where the only partition wall parent material 1 is present".

Therefore, when the depth of "the boundary portion between the surface layer 21 of the collecting layer 13 and the deep layer 22 of the collecting layer 13" is subtracted from the depth of "the boundary portion between the region where the deep layer 22 of the collecting layer 13 and the partition wall parent material 1 are mixed and the region where the only partition wall parent material 1 is present", the thickness of the deep layer 22 of the collecting layer 13 (the thickness of the region where the deep layer 22 of the collecting layer 13 and the partition wall parent material 1 are mixed) is obtained. Moreover, the depth of "the boundary portion between the region where the deep layer 22 of the collecting layer 13 and the partition wall parent material 1 are mixed and the region where the only partition wall parent material 1 is present" is the same as the thickness of the collecting layer 13. Moreover, the depth of "the boundary portion between the surface layer 21 of the collecting layer 13 and the deep layer 22 of the collecting layer 13" is the same as the thickness of the surface layer 21 of the collecting layer 13.

In the honeycomb structure 100 of the present embodiment, the pore surface area per unit volume of the partition wall 23 is preferably from 1.4 to 20 $m^2/cm^3$, further preferably from 1.5 to 17 $m^2/cm^3$, and especially preferably from 4 to 17 $m^2/cm^3$. When the pore surface area is smaller than 1.4 $m^2/cm^3$, an initial collecting efficiency when a PM in an exhaust gas is collected deteriorates sometimes. When the pore surface area is larger than 20 $m^2/cm^3$, the initial pressure loss increases sometimes. Moreover, "the pore surface area per unit volume of the partition wall 23" is a value obtained by multiplying "a specific surface area" by "a density". The specific surface area is measured by using a flow type specific surface area automatic measuring apparatus (trade name: Flow Sorb manufactured by Micromeritics Co.). As a measurement gas, krypton is used. The density is measured by using a dry type automatic densimeter (trade name: Accupyc manufactured by Micromeritics Co.). As a measuring gas, helium is used.

In the partition wall parent material 1, the average pore diameter is preferably from 10 to 60 μm, and the porosity is preferably from 40 to 70%. The average pore diameter is further preferably from 20 to 50 μm, and the porosity is further preferably from 50 to 65%. The average pore diameter is especially preferably from 20 to 30 and the porosity is especially preferably from 55 to 65%. When the average pore diameter is smaller than 10 μm or the porosity is smaller than 40%, the initial pressure loss becomes high sometimes. Moreover, when the average pore diameter is larger than 60 μm or the porosity is larger than 70%, a strength of the honeycomb structure lowers sometimes. The average pore diameter is a value measured with a mercury porosimeter. The porosity is a value measured with the mercury porosimeter.

A thickness of the partition wall parent material 1 is preferably from 100 to 500 μm, further preferably from 200 to 400 μm, and especially preferably from 300 to 350 μm. When the thickness is smaller than 100 μm, the strength of the honeycomb structure lowers sometimes. When the thickness is larger than 500 μm the initial pressure loss becomes high sometimes.

In the honeycomb structure 100 of the present embodiment, there are not any special restrictions on a shape of the honeycomb base material 4. For example, a cylindrical shape, a tubular shape with an elliptic end surface, a polygonal tubular shape with "a square, rectangular, triangular, pentangular, hexagonal, octagonal or another" end surface and the like are preferable. In the honeycomb structure 100 shown in FIG. 1 and FIG. 2, the shape is the cylindrical shape. Moreover, the honeycomb structure 100 shown in FIG. 1 and FIG. 2 includes an outer peripheral wall 3, but does not have to include the outer peripheral wall 3. The outer peripheral wall 3 is preferably formed together with the partition wall parent material, when a honeycomb formed body is formed by extrusion in a process of preparing the honeycomb structure. Moreover, the outer peripheral wall 3 may be formed by coating the outer periphery of the honeycomb structure with a ceramic material.

In the honeycomb structure 100 of the present embodiment, a material of the honeycomb base material 4 is preferably a ceramic. Owing to excellent strength and heat resistance, at least one selected from the group consisting of cordierite, silicon carbide, a silicon-silicon carbide composite material, mullite, alumina, aluminum titanate, silicon nitride, and a silicon carbide-cordierite composite material is further preferable. Among these materials, cordierite is especially preferable.

In the honeycomb structure 100 of the present embodiment, there are not any special restrictions on a cell shape of the honeycomb base material 4 (the cell shape in a cross section of the honeycomb structure which is orthogonal to a central axis direction (a cell extending direction)). Examples of the shape include a triangular shape, a quadrangular shape, a hexagonal shape, an octagonal shape, a round shape, and combinations of these shapes. As the quadrangular shape, a square shape or a rectangular shape is preferable.

In the honeycomb structure 100 of the present embodiment, there are not any special restrictions on a cell density of the honeycomb base material 4, but the cell density is preferably from 16 to 96 $cells/cm^2$, and further preferably from 32 to 64 $cells/cm^2$. When the cell density is smaller than 16 $cells/cm^2$, the area of the partition walls to collect the particulate matter becomes small. When the exhaust gas flows through the cells, the pressure loss becomes large in a short time sometimes. When the cell density is larger than 96 $cells/cm^2$, a cell sectional area (the area of a cross section orthogonal to the cell extending direction) becomes small. Therefore, the pressure loss becomes large sometimes.

In the honeycomb structure 100 of the present embodiment, a porosity of "a portion which does not penetrate into the pores of the partition wall parent material 1" (the surface layer 21) in the collecting layer 13 is preferably 60% or larger, further preferably from 70 to 90%, and especially preferably from 80 to 90%. When the porosity is smaller than 60%, the initial pressure loss becomes high sometimes.

In the honeycomb structure 100 of the present embodiment, the thickness of the collecting layer 13 is preferably from 5 to 30% of that of "the partition wall 23 including the partition wall parent material 1 and the collecting layer 13 disposed on the partition wall parent material 1", further preferably from 5 to 17%, and especially preferably from 10 to 17%. When the thickness is smaller than 5% and the PM in the exhaust gas is collected, the PM penetrates into the porous partition walls, to close the pores of the partition walls. The pressure loss increases sometimes. When the thickness is larger than 30%, the initial pressure loss becomes high sometimes.

In the honeycomb structure 100 of the present embodiment, as a material of the collecting layer 13, a ceramic is preferable. Owing to an excellent heat resistance, at least one selected from the group consisting of cordierite, silicon carbide, mullite, alumina, spinel, aluminum titanate, silicon nitride, zirconia, titania, zirconium silicate and silica is further preferable.

Moreover, in the honeycomb structure 100 of the present embodiment, a material of the partition wall parent material 1 is preferably cordierite, and the material of the collecting layer 13 is preferably a material containing at least one selected from the group consisting of alumina, mullite and spinel.

In the honeycomb structure 100 of the present embodiment, an average pore diameter of the pores of the surface layer 21 is preferably from 0.5 to 10 µm, further preferably from 1 to 5 µm, and especially preferably from 1 to 3 µm. When the average pore diameter is smaller than 0.5 µm, the initial pressure loss becomes high sometimes. When the average pore diameter is larger than 10 µm, the initial collecting efficiency when the PM in the exhaust gas is collected lowers sometimes. The average pore diameter is a value measured by a bubble point/half dry process (ASTM E1294-89).

When a conventional honeycomb structure which is not provided with the collecting layer is used as a filter to treat the PM-containing exhaust gas, the PM penetrates into the pores of the partition walls to clog the pores, and hence there has been a problem that the pressure loss rapidly rises. On the other hand, in the honeycomb structure of the present invention, the collecting layer is formed on the surfaces of the partition walls in the inflow cells. Therefore, the PM is collected by the collecting layer, and can be prevented from penetrating into the pores of the partition walls. It is possible to suppress the rapid rise of the pressure loss.

(2) Manufacturing Method of Honeycomb Structure:

An embodiment of a manufacturing method of the honeycomb structure of the present invention includes a forming step of forming a ceramic forming raw material containing a ceramic raw material, and forming a honeycomb formed body including a non-fired partition wall parent material to partition and form a plurality of cells which become through channels of a fluid; a plugging step of arranging plugged portions in open frontal areas of the predetermined cells in an end surface on an inflow side of the fluid and open frontal areas of the remaining cells in an end surface on an outflow side of the fluid in the honeycomb formed body; a collecting layer forming raw material coating step of attaching, to the surface of the non-fired partition wall parent material in the remaining cells of the honeycomb formed body, a collecting layer forming raw material containing a ceramic raw material for the collecting layer which has a higher melting point than the ceramic raw material and an aqueous electrolyte solution having a concentration of 50 to 100% of a saturated solubility; and a firing step of firing the honeycomb formed body coated with the collecting layer forming raw material to prepare the honeycomb structure.

In the manufacturing method of the honeycomb structure of the present embodiment, "a type and an average particle diameter of the ceramic raw material, a type and an average particle diameter of a pore former and a blend ratio of these raw materials" in the ceramic forming raw material are regulated. "A type and a specific surface area of the ceramic raw material for the collecting layer, a type and an average particle diameter of a pore former, a type of a viscosity regulator and a blend ratio of these raw materials" in the collecting layer forming raw material are regulated. In consequence, it is possible to obtain the honeycomb structure including a honeycomb base material including a porous partition wall parent material to partition and form a plurality of cells which become through channels of a fluid; plugged portions arranged in open frontal areas of the predetermined cells in an end surface on an inflow side of the fluid and open frontal areas of the remaining cells in an end surface on an outflow side of the fluid; and a porous collecting layer disposed on the surface of the partition wall parent material in the remaining cells, wherein a melting point of a material constituting the collecting layer is higher than that of a material constituting the partition wall parent material, a pore surface area per unit volume of the collecting layer is 2.0 times or more a pore surface area per unit volume of the partition wall parent material, and a thickness of a portion of the collecting layer which penetrates into pores of the partition wall parent material is 6% or smaller of that of each of partition walls" (the above honeycomb structure of the present invention).

In consequence, the embodiment of the manufacturing method of the honeycomb structure of the present invention includes the collecting layer forming raw material coating step of attaching, to the surface of the non-fired partition wall parent material in the remaining cells of the honeycomb formed body, the collecting layer forming raw material containing "the ceramic raw material for the collecting layer which has a higher melting point than the ceramic raw material" and "the aqueous electrolyte solution having a concentration of 50 to 100% of the saturated solubility". Therefore, it is possible to prevent a collecting layer forming slurry from penetrating into the partition wall parent material of the honeycomb formed body, and it is possible to decrease the thickness of "a portion which penetrates into pores of the partition wall parent material" in the collecting layer of the obtained honeycomb structure. Moreover, in one firing step, both the honeycomb formed body (the honeycomb base material) and the collecting layer forming raw material (the collecting layer) are fired. Consequently, as compared with a case where the honeycomb formed body (the honeycomb base material) and the collecting layer forming raw material (the collecting layer) are separately fired, an energy consumption can be decreased.

Hereinafter, each step of the manufacturing method of the honeycomb structure of the present embodiment will be described.

Figure 4:
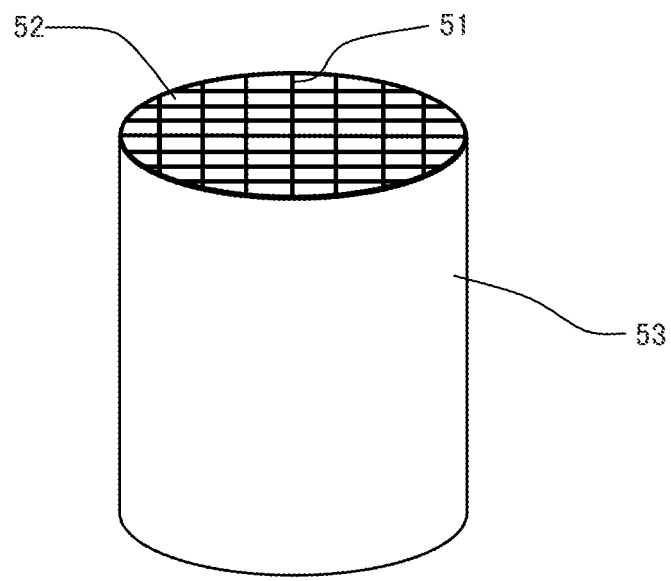
FIG. 4 is a perspective view schematically showing a honeycomb formed body prepared in a forming step of an embodiment of a manufacturing method of a honeycomb structure according to the present invention.
Figure 5:
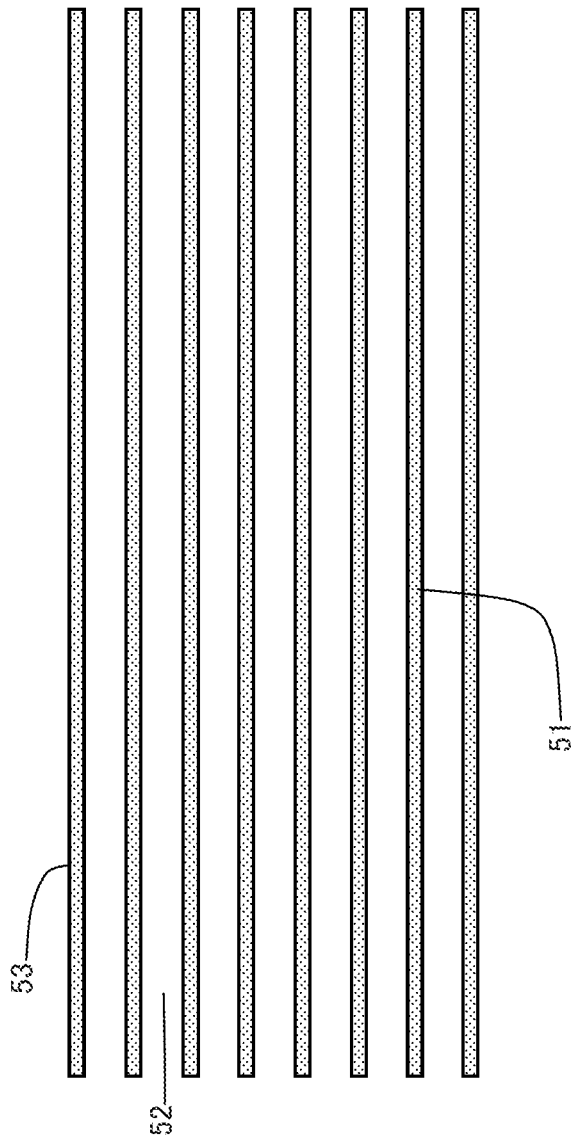
FIG. 5 is a schematic view showing a cross section of the honeycomb formed body prepared in the forming step of the embodiment of the manufacturing method of the honeycomb structure according to the present invention, which is parallel to a cell extending direction.

(2-1) Forming Step:

First, in a forming step, a ceramic forming raw material containing a ceramic raw material is formed into a honeycomb formed body (the formed body of a honeycomb configuration) 50 including a non-fired partition wall parent material 51 to partition and form a plurality of cells 52 which become through channels of a fluid as shown in FIG. 4 and FIG. 5. FIG. 4 is a perspective view schematically showing a honeycomb formed body 50 prepared in the forming step of the embodiment of the manufacturing method of the honeycomb structure according to the present invention. The honeycomb formed body 50 shown in FIG. 4 and FIG. 5 includes an outer peripheral wall 53. FIG. 5 is a schematic view showing a cross section of the honeycomb formed body 50 prepared in the forming step of the embodiment of the manufacturing method of the honeycomb structure according to the present invention, which is parallel to an extending direction of the cells 52.

The ceramic raw material contained in the ceramic forming raw material is preferably at least one selected from the group consisting of a cordierite forming raw material, cordierite, silicon carbide, a silicon-silicon carbide composite material, mullite, alumina, aluminum titanate, silicon nitride, and a silicon carbide-cordierite composite material. It is to be noted that the cordierite forming raw material is a ceramic raw material blended to obtain a chemical composition in a range in which silica is from 42 to 56 mass %, alumina is from 30 to 45 mass %, and magnesia is from 12 to 16 mass %, and the raw material is fired to become cordierite.

Moreover, this ceramic forming raw material is preferably prepared by mixing the above ceramic raw material with a dispersion medium, an organic binder, an inorganic binder, a pore former, a surfactant and the like. There are not any special restrictions on composition ratios of the respective raw materials, and the composition ratios are preferably set in accordance with a configuration, a material and the like of a honeycomb structure to be prepared.

To regulate a pore surface area, average pore diameter and porosity of the partition wall parent material of the honeycomb structure to be prepared, the respective raw materials are further preferably regulated as follows.

As the ceramic raw material, talc, kaolin, alumina and silica are preferably used. An average particle diameter of talc is preferably from 10 to 30 μm. An average particle diameter of kaolin is preferably from 1 to 10 μm. An average particle diameter of alumina is preferably from 1 to 20 μm. An average particle diameter of silica is preferably from 1 to 60 μm. Moreover, as the pore former, starch, carbon, resin balloon, polymethyl methacrylate (PMMA), a water absorbing resin or a combination of them is preferably used. Moreover, an average particle diameter of the pore former is preferably from 10 to 100 μm. Furthermore, an amount of the pore former to be added is preferably from 0.5 to 10 parts by mass with respect to 100 parts by mass of the ceramic raw material. Moreover, as the organic binder, methylcellulose, hydroxypropyl methylcellulose, hydroxypropyl ethylcellulose, hydroxyethylcellulose, carboxymethylcellulose, polyvinyl alcohol, or a combination of them is preferably used. Furthermore, an amount of the organic binder to be added is preferably from 1 to 10 parts by mass with respect to 100 parts by mass of the ceramic raw material.

When the ceramic forming raw material is formed, the ceramic forming raw material is first kneaded to form a kneaded material, and the obtained kneaded material is preferably formed in a honeycomb shape. There are not any special restrictions on a method of kneading the ceramic forming raw material to form the kneaded material, and examples of the method include methods using a kneader, a vacuum clay kneader and the like. There are not any special restrictions on a method of forming the kneaded material into the honeycomb formed body, and a known forming method such as extrusion-forming or injection-forming can be used. Preferable examples of the method include a method of extruding the kneaded material to form the honeycomb formed body by use of a die having a desirable cell shape, partition wall thickness and cell density. As a material of the die, a hard metal which is not easily worn is preferable.

There are not any special restrictions on a shape of the honeycomb formed body. A cylindrical shape shown in FIG. 4, a tubular shape with an elliptic end surface, a polygonal tubular shape with "a square, rectangular, triangular, pentangular, hexagonal, octagonal or another" end surface and the like are preferable.

Moreover, after the above forming, the obtained honeycomb formed body may be dried. There are not any special restrictions on a drying method, but examples of the method include hot air drying, microwave drying, dielectric drying, reduced pressure drying, vacuum drying, and freeze drying. Above all, the dielectric drying, the microwave drying or the hot air drying is preferably performed alone or as a combination of them.

It is to be noted that the honeycomb formed body is fired after coating the partition walls with the collecting layer forming raw material, and is not fired prior to coating the partition walls with the collecting layer forming raw material.

Figure 6:
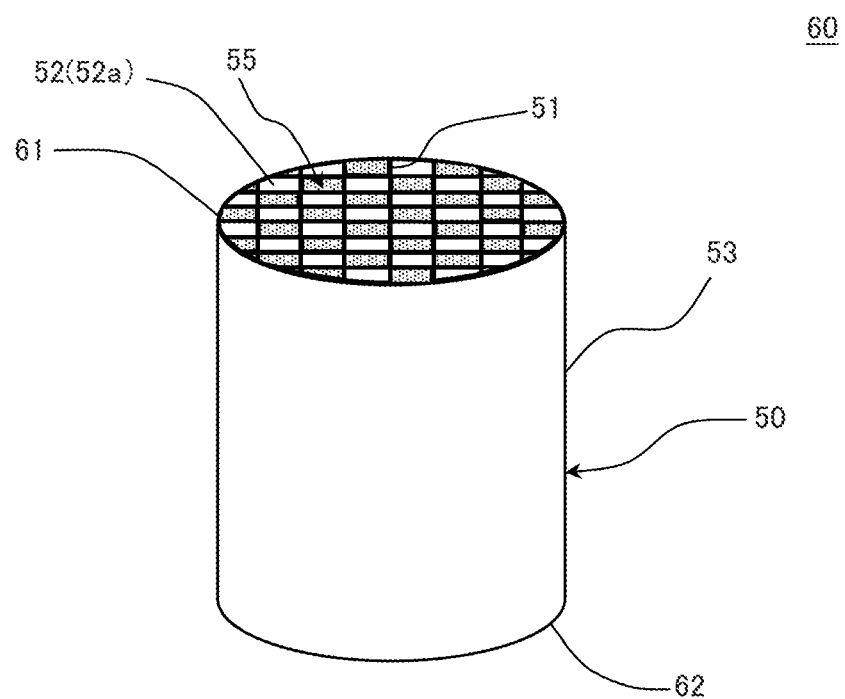
FIG. 6 is a perspective view schematically showing a one-side plugged honeycomb formed body prepared in a first plugging step of the embodiment of the manufacturing method of the honeycomb structure according to the present invention.
Figure 7:
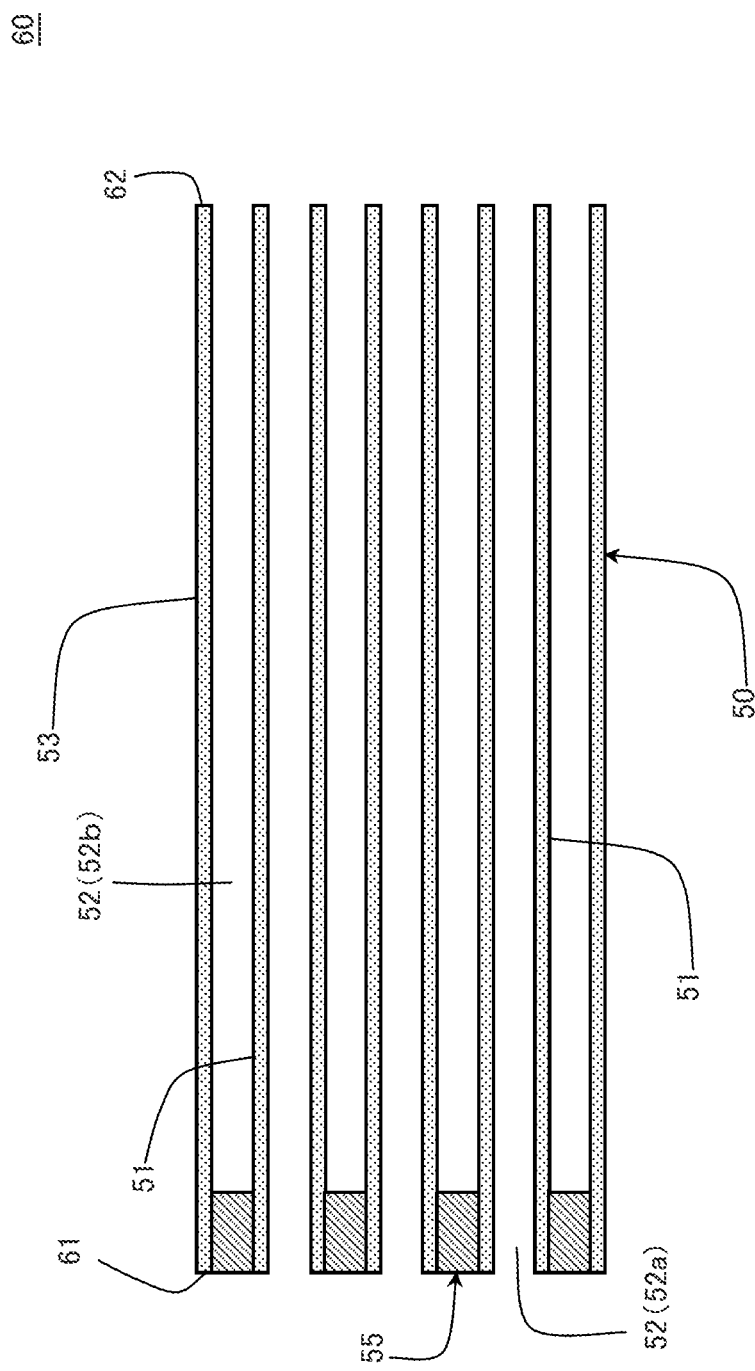
FIG. 7 is a schematic view showing a cross section of the one-side plugged honeycomb formed body prepared in the first plugging step of the embodiment of the manufacturing method of the honeycomb structure according to the present invention, which is parallel to the cell extending direction.

(2-2) First Plugging Step:

In a first plugging step after the forming step, as shown in FIG. 6 and FIG. 7, plugged portions 55 are arranged in open frontal areas of the predetermined cells 52 (outflow cells 52b) in an end surface 61 on an inflow side of a fluid in the honeycomb formed body 50. The plugged portions 55 are arranged in the honeycomb formed body 50 to form a one-side plugged honeycomb formed body 60. FIG. 6 is a perspective view schematically showing the one-side plugged honeycomb formed body 60 prepared in the first plugging step of the embodiment of the manufacturing method of the honeycomb structure according to the present invention. FIG. 7 is a schematic view showing a cross section of the one-side plugged honeycomb formed body 60 prepared in the first plugging step of the embodiment of the manufacturing method of the honeycomb structure according to the present invention, which is parallel to the extending direction of the cells 52.

When the honeycomb formed body is charged with a plugging material, the one end surface side is charged with the plugging material. Examples of a method of charging the one end surface side with the plugging material include a method including a masking step of attaching a sheet to the one end surface of the honeycomb formed body to make holes at positions which overlap with "the cells to be provided with the plugged portions" in the sheet, and a pressure pouring step of placing, under pressure, "the end of the honeycomb formed body to which the sheet is attached" into a container in which the plugging material is stored, to pour, under pressure, the plugging material into the cells of the honeycomb formed body. When the plugging material is poured under pressure into the cells of the honeycomb formed body, the plugging material passes through the holes formed in the sheet to charge, with the material, the only cells which communicate with the holes formed in the sheet.

The plugging material can be prepared by suitably mixing raw materials as examples of constitutional elements of the ceramic forming raw material. The ceramic raw material contained in the plugging material is preferably the same as that for use as a raw material of the partition wall parent material.

Next, the plugging material with which the honeycomb formed body is charged is preferably dried.

In the one-side plugged honeycomb formed body 60 shown in FIG. 6 and FIG. 7, inflow cells 52a and the outflow cells 52b are preferably alternately arranged so that the plugged portions 55 and the open frontal areas of the cells 52 form a checkered pattern in the one end surface (the inflow-side end surface 61) provided with the plugged portions.

Figure 8:
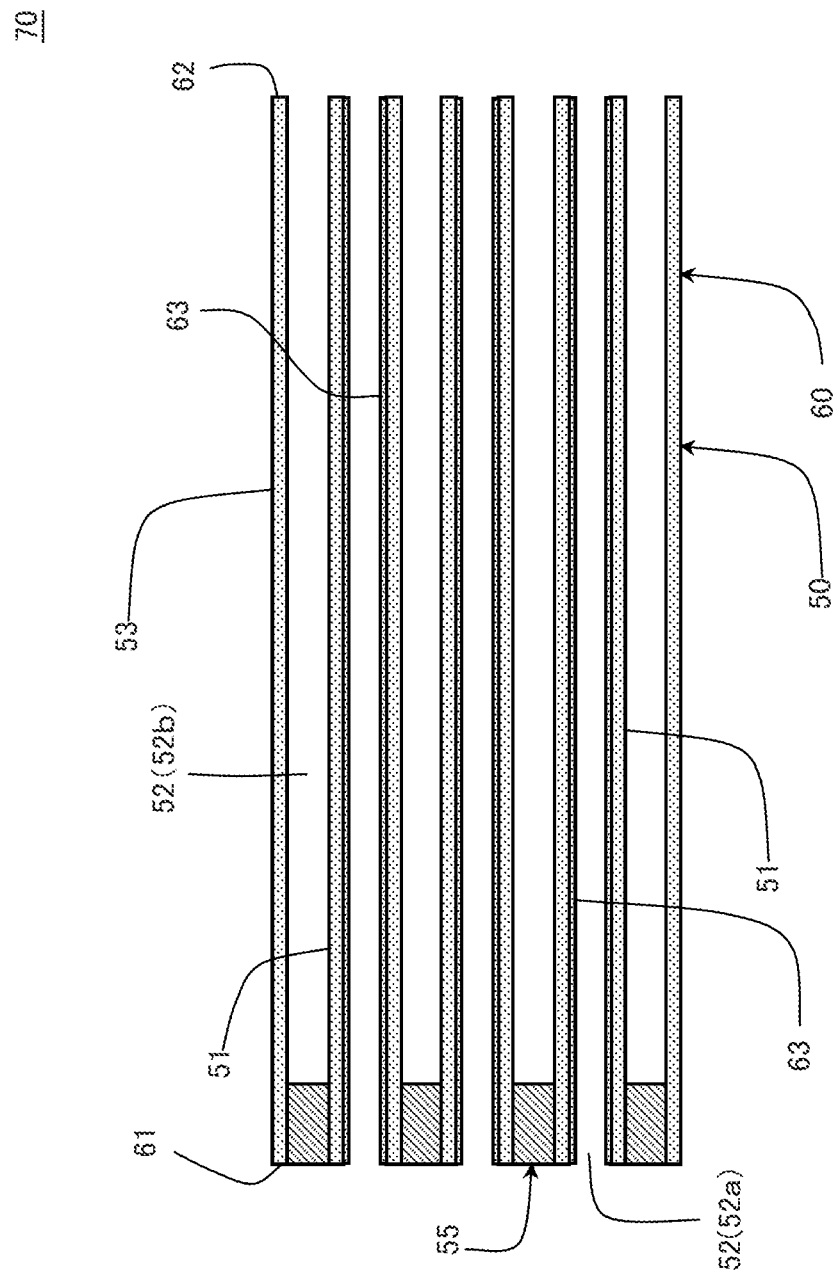
FIG. 8 is a schematic view showing a cross section of the one-side plugged honeycomb formed body with a non-fired collecting layer prepared in a collecting layer forming raw material coating step in the embodiment of the manufacturing method of the honeycomb structure according to the present invention, which is parallel to the cell extending direction.
Figure 9:
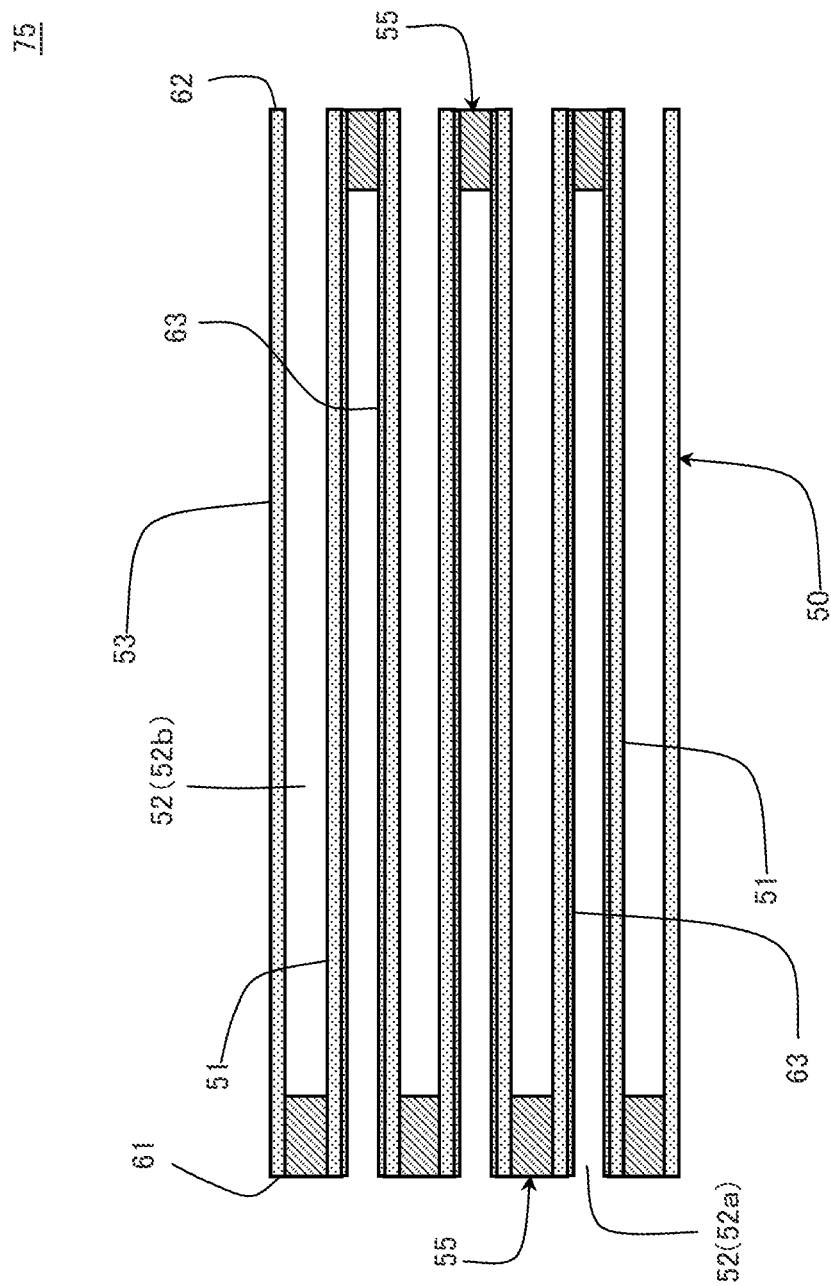
FIG. 9 is a schematic view showing a cross section of the honeycomb formed body with the non-fired collecting layer prepared in a second plugging step in the embodiment of the manufacturing method of the honeycomb structure according to the present invention, which is parallel to the cell extending direction.

(2-3) Collecting Layer Forming Raw Material Coating Step:

Next, a collecting layer forming raw material containing "a ceramic raw material for the collecting layer which has a higher melting point than the ceramic raw material of the non-fired partition wall parent material 51 and an aqueous electrolyte solution having a concentration of 50 to 100% of a saturated solubility is attached to the surface of a non-fired partition wall parent material 51 in the remaining cells 52 of the honeycomb formed body (the one-side plugged honeycomb formed body 60) which are not provided with the plugged portions (a collecting layer forming raw material coating step). The cells 52 which are not provided with the plugged portions 55 are referred to as "the remaining cells", and "the predetermined cells" and "the remaining cells" are combined to form all the cells. Moreover, "the remaining cells 52" become the inflow cells 52a. As shown in FIG. 8, the collecting layer forming raw material is attached to the surface of the non-fired partition wall parent material 51 in the remaining cells 52 (the inflow cells 52a) of the honeycomb formed body 50 (the one-side plugged honeycomb formed body 60) to form a non-fired collecting layer 63, whereby it is possible to obtain a one-side plugged honeycomb formed body 70 with the non-fired collecting layer. It is to be noted that the collecting layer forming raw material may be attached not only to the surface of the non-fired partition wall parent material 51 in the inflow cells 52a but also to the surface of the non-fired partition wall parent material 51 in the outflow cells 52b to form the non-fired collecting layer 63. FIG. 9 is a schematic view showing a cross section of the one-side plugged honeycomb formed body 70 with the non-fired collecting layer prepared in the collecting layer forming raw material coating step in the embodiment of the manufacturing method of the honeycomb structure according to the present invention, which is parallel to the extending direction of the cells 52.

The collecting layer forming raw material for use in the collecting layer forming raw material coating step contains the ceramic raw material for the collecting layer and the aqueous electrolyte solution as described above. The ceramic raw material for the collecting layer has a higher melting point than the ceramic raw material (the raw material of the partition wall parent material), and the concentration of the aqueous electrolyte solution in the collecting layer forming raw material is from 50 to 100% of the saturated solubility. The collecting layer forming raw material is preferably in a slurried state. Here, "the aqueous electrolyte solution contained in the collecting layer forming raw material" means an aqueous solution (the aqueous solution contained in the collecting layer forming raw material) including "water in the collecting layer forming raw material" and "an electrolyte contained in the collecting layer forming raw material and dissolved in the water". Moreover, "the concentration of the aqueous electrolyte solution in the collecting layer forming raw material" means a ratio of "an amount of the electrolyte" in the collecting layer forming raw material with respect to a total of "an amount of the water" and "the amount of the electrolyte" in the collecting layer forming raw material.

Thus, the collecting layer forming raw material contains "the aqueous electrolyte solution having a concentration of 50 to 100% of the saturated solubility" in this manner. Therefore, in the collecting layer forming raw material coating step, it is possible to suppress a problem that "the water in the collecting layer forming raw material is absorbed by the honeycomb formed body 50, and the honeycomb formed body 50 contains the water to lower a strength of the honeycomb formed body 50". Moreover, the non-fired honeycomb formed body is coated with the collecting layer forming raw material, and hence it is possible to prevent "the collecting layer forming raw material from penetrating into the partition wall parent material of the fired honeycomb structure". Furthermore, since the melting point of the ceramic raw material for the collecting layer is higher than that of the ceramic raw material of the partition wall parent material 51, it is possible to suppress the decrease of the pore surface area per unit volume of the collecting layer due to the excessive melting of the ceramic raw material for the collecting layer, at the time of firing.

The electrolyte contained in the collecting layer forming raw material preferably includes one anion selected from the group consisting of a citrate ion, a tartrate ion, a sulfate ion, an acetate ion and a chloride ion, and one cation selected from the group consisting of an alkali earth metal ion, a hydrogen ion and an ammonium ion. Examples of the electrolyte can include a citric acid, a tartaric acid, a sulfuric acid, an acetic acid, a hydrochloric acid, magnesium citrate, magnesium tartrate, magnesium sulfate, magnesium acetate, magnesium chloride, ammonium citrate, ammonium tartrate, ammonium sulfate, ammonium acetate, and ammonium chloride. Among these electrolytes, the citric acid is preferable.

The concentration of the aqueous electrolyte solution contained in the collecting layer forming raw material is preferably from 50 to 100%, further preferably from 70 to 100%, and especially preferably from 90 to 100% of the saturated solubility in the collecting layer forming raw material. When the concentration is smaller than 50%, the honeycomb formed body absorbs the water in the collecting layer forming raw material, and the strength of the honeycomb formed body lowers sometimes.

The melting point of the ceramic raw material contained in the collecting layer forming raw material is higher than that of the ceramic raw material of the partition wall parent material, and is preferably from 300 to 700° C. higher than the melting point of the ceramic raw material of the partition wall parent material.

AS the ceramic raw material for the collecting layer contained in the collecting layer forming raw material, at least one selected from the group consisting of a cordierite forming raw material, cordierite, silicon carbide, mullite, alumina, spinel, aluminum titanate, silicon nitride, zirconia, titania, zirconium silicate, and silica. Among these materials, at least one selected from the group consisting of mullite, alumina and spinel is preferable.

A specific surface area of the ceramic raw material for the collecting layer is preferably from 0.8 to 200 $m^2/g$, further preferably from 3 to 20 $m^2/g$, and especially preferably from 5 to 15 $m^2/g$. When the specific surface area is larger than 200 $m^2/g$, the pore surface area per unit volume of the collecting layer becomes excessively large. Therefore, cracks are generated in the collecting layer in the firing step sometimes. When the specific surface area is smaller than 0.8 $m^2/g$, the pore surface area per unit volume of the collecting layer becomes excessively small. Therefore, the initial collecting efficiency lowers sometimes. The specific surface area of the ceramic raw material for the collecting layer is a value measured by using a flow type specific surface area automatic measuring apparatus (trade name: Flow Sorb manufactured by Micromeritics Co.).

In the collecting layer forming raw material, a pore former, a viscosity regulator and the like are preferably contained, in addition to the ceramic raw material for the collecting layer and the aqueous electrolyte solution.

As the pore former, polymethyl methacrylate (PMMA), carbon, starch or the like can be used. Among these pore formers, PMMA is preferable. A content of the pore former is preferably from 5 to 1000 parts by mass, further preferably from 10 to 100 parts by mass, and especially preferably from 40 to 80 parts by mass with respect to 100 parts by mass of the ceramic raw material for the collecting layer. When the content is smaller than 5 parts by mass, the initial pressure loss becomes high sometimes. When the content is larger than 1000 parts by mass, the initial collecting efficiency lowers sometimes.

Moreover, a total volume of the ceramic raw material for the collecting layer and the pore former is preferably from 5 to 30 vol %, further preferably from 10 to 20 vol %, and especially preferably from 15 to 20 vol % of the whole volume of the collecting layer forming raw material. When the volume is smaller than 5 vol %, the thickness of the collecting layer is not easily regulated sometimes. When the volume is larger than 30 vol %, a fluidity of the collecting layer forming raw material lowers, and the surfaces of the partition walls are not easily coated with the collecting layer forming raw material.

An average particle diameter of the pore former is preferably from 0.5 to 50 µm, further preferably from 5 to 30 µm and especially preferably from 5 to 20 µl. When the average particle diameter is larger than 50 μm the initial collecting efficiency lowers sometimes. When the average particle diameter is smaller than 0.5 μm, the initial pressure loss becomes high sometimes. The average particle diameter of the pore former is a value measured by a laser diffraction scattering process.

As the viscosity regulator in the collecting layer forming raw material, a surfactant and/or a micro organic fiber insoluble in water is preferable.

As the surfactant, polystyrene sulfonate, polyoxyethylene alkyl sulfate ether, polyoxyethylene alkylene alkyl ether, polyoxyethylene distyrenated phenyl ether, polyoxyethylene tribenzyl phenyl ether, naphthalene sulfonate formalin condensate, polyoxyethylene sorbitan monolaurate, palm oil fatty acid amidopropyl betaine liquid or the like can be used.

A content of the surfactant in the collecting layer forming raw material is preferably from 0.1 to 10 parts by mass, and further preferably from 0.5 to 5 parts by mass, when a total content of the ceramic raw material for the collecting layer and the pore former is 100 parts by mass. When the content is smaller than 0.1 part by mass, the fluidity of the collecting layer forming raw material lowers, and the surfaces of the partition walls are not easily coated with the collecting layer forming raw material sometimes. Even when the content is larger than 10 parts by mass, the fluidity does not enhance sometimes.

As the micro organic fiber insoluble in water, a cellulose fiber, an aramid fiber or the like can be used. Here, the micro organic fiber is a fiber which has a pillar-like structure or a needle-like structure and in which a ratio (a long diameter/a short diameter) between the long diameter (a length of the fiber (the fiber length)) and the short diameter (the largest length among lengths in a direction orthogonal to a length direction (a long diameter direction)) is 1000 or larger, and the length of the short diameter is 0.5 μm or smaller. The micro organic fiber is used as the viscosity regulator, and is preferably insoluble in water. When the viscosity of the collecting layer forming raw material is regulated by the micro organic fiber insoluble in water, the thickness of the collecting layer can be regulated.

A content of the micro organic fiber in the collecting layer forming raw material is preferably from 0.1 to 1.0 part by mass, and further preferably from 0.2 to 0.6 part by mass with respect to 100 parts by mass of the ceramic raw material for the collecting layer. When the content is smaller than 0.1 part by mass, the thickness of the collecting layer forming raw material becomes small sometimes. When the content is larger than 1.0 part by mass, the thickness of the collecting layer forming raw material becomes large sometimes.

The short diameter of the micro organic fiber is preferably from 0.01 to 0.5 μm, and further preferably from 0.01 to 0.1 μm. When the short diameter is larger than 0.5 μm, an effect of viscosity regulation is not sufficient sometimes. When the short diameter is smaller than 0.01 μm, the fiber aggregates sometimes. The short diameter of the micro organic fiber is a value measured with a scanning type electron microscope (SEM).

When both the surfactant and the micro organic fiber are contained in the collecting layer forming raw material, a total mass of the surfactant and the micro organic fiber is preferably 10 parts by mass or smaller with respect to 100 parts by mass of the ceramic raw material for the collecting layer.

A content of the water in the collecting layer forming raw material is preferably from 30 to 80 parts by volume, when a total volume of the ceramic raw material for the collecting layer and the pore former is 100 parts by volume. As to the content of the water, a suitable amount may be selected from the above range in accordance with a type of the electrolyte, ceramic raw material or pore former. When the content of the water is small, the viscosity of the collecting layer forming raw material becomes high, and the formed body is not easily coated with the material sometimes. When the content of the water is large, the viscosity of the collecting layer forming raw material lowers, and it becomes difficult to regulate the thickness of the collecting layer sometimes.

As a method of attaching the collecting layer forming raw material to the surface of the non-fired partition wall parent material in the remaining cells of the honeycomb formed body (the one-side plugged honeycomb formed body), a method of dipping the honeycomb structure into the slurried collecting layer forming raw material (dip coating) or a method of pouring the slurried collecting layer forming raw material into the cells of the honeycomb structure is preferable. By such a method, the surface of the partition walls in the cells can evenly be coated with the collecting layer forming raw material.

(2-4) Second Plugging Step

Next, as shown in FIG. 9, the plugged portions 55 are arranged in open frontal areas of the remaining cells 52 (the inflow cells 52a) in an end surface 62 on the outflow side of the fluid in the honeycomb formed body 50 (the one-side plugged honeycomb formed body 70 with the non-fired collecting layer 63 (see FIG. 8)). In consequence, a honeycomb formed body 75 with the non-fired collecting layer can be obtained.

In the second plugging step, the plugged portions 55 are preferably formed in the outflow-side end surface 62 of the one-side plugged honeycomb formed body 70 with the non-fired collecting layer 63 (see FIG. 8) in the same manner as in the first plugging step.

(2-5) Firing Step:

Next, the honeycomb formed body coated with the collecting layer forming raw material (the honeycomb formed body with the non-fired collecting layer) is fired to prepare the honeycomb structure 100 (see FIG. 1 and FIG. 2) (the firing step). In the firing step, the honeycomb formed body, the plugged portions and "the collecting layer forming raw material with which the surfaces of the partition walls in the cells are coated" are fired, to obtain the honeycomb structure 100 including the honeycomb base material 4, the plugged portions 55 and the collecting layer. The honeycomb formed body (the honeycomb formed body with the non-fired collecting layer) is fired after coating the partition wall surfaces in the cells with the collecting layer forming raw material. In consequence, it is possible to prevent the penetration of the collecting layer forming raw material into the partition wall parent material.

Prior to firing (finally firing) the honeycomb formed body (the honeycomb formed body with the non-fired collecting layer 75), the honeycomb formed body (the honeycomb formed body with the non-fired collecting layer 75) is preferably calcinated. The calcinating is performed for degreasing. There are not any special restrictions on a calcinating method, as long as organic matters (an organic binder, a surfactant, a pore former, etc.) in the formed body can be removed. In general, a burning temperature of the organic binder is from about 100 to 300° C., and a burning temperature of the pore former is from about 200 to 800° C. Therefore, calcinating conditions preferably include heating performed in an oxidation atmosphere at about 200 to 1000° C. for 3 to 100 hours.

The firing (final firing) of the honeycomb formed body (the honeycomb formed body with the non-fired collecting layer) is performed to sinter and densify the forming raw material constituting the calcinated formed body, thereby acquiring a predetermined strength. Firing conditions (temperature, time, and atmosphere) vary in accordance with a type of the forming raw material, and hence adequate conditions may be selected in accordance with the type. For example, when the cordierite forming raw material is used, the firing temperature is preferably from 1410 to 1440° C. Moreover, the firing time is preferably from 4 to 8 hours as maximum temperature keeping time. There are not any special restrictions on an apparatus which performs the calcinating and the final firing, but an electric furnace, a gas furnace or the like can be used.

EXAMPLES

Hereinafter, the honeycomb structure and the manufacturing method of the honeycomb structure of the present invention will further specifically be described with respect to examples. However, the present invention is not limited to these examples.

Example 1

As a ceramic raw material, a cordierite forming raw material (talc, kaolin and alumina) was used. A mass ratio of talc, kaolin and alumina was a mass ratio at which cordierite was obtained after firing. In 100 parts by mass of the ceramic raw material, 4 parts by mass of binder (methylcellulose) and 35 parts by mass of water were mixed to obtain a ceramic forming raw material. The obtained ceramic forming raw material was kneaded by using a kneader, to obtain a kneaded material. The obtained kneaded material was extruded by using a vacuum extrusion-forming machine, to obtain a honeycomb formed body. In the obtained honeycomb formed body, a thickness of a partition wall parent material was 300 μm, a cell density was 48 cells/cm$^2$, and the whole shape was a cylindrical shape (a diameter of an end surface was 40 mm, and a length in a cell extending direction was 100 mm). As a cell shape, a shape orthogonal to the cell extending direction was a square. The obtained honeycomb formed body was dried with microwaves and hot air.

Next, part of open frontal areas of a plurality of cells in an end surface (the inflow-side end surface) of the honeycomb formed body was masked. At this time, the cells provided with the mask and the cells which were not provided with the mask were alternately arranged. Moreover, the end of the formed body on a masked side was immersed into a plugging slurry containing a cordierite forming raw material, to charge, with the plugging slurry, the open frontal areas of the cells which were not provided with the mask. In consequence, a one-side plugged honeycomb formed body was obtained.

Next, 150 g of alumina particles having a specific surface area of 7 m$^2$/g, 110 g of polymethyl methacrylate (PMMA) having an average particle diameter of 5 μm, 2 g of polystyrene sulfonate, 384 g of citric acid and 286 g of water were mixed with a homogenizer, and a slurried collecting layer forming raw material was prepared. A content of the citric acid was 93% of a saturated solubility (20° C.). A total volume of the alumina particles and PMMA was 20% of the whole volume of the collecting layer forming raw material.

Next, an end of the one-side plugged honeycomb formed body which was provided with the plugged portions was immersed into the collecting layer forming raw material, to dip-coat the honeycomb formed body with the collecting layer forming raw material. At this time, substantially the whole one-side plugged honeycomb formed body was immersed into the collecting layer forming raw material so that all partition walls in inflow cells were coated with the collecting layer forming raw material. Moreover, an outflow-side end surface of the one-side plugged honeycomb formed body (the end surface which was not provided with the plugged portions) was prevented from coming in contact with the collecting layer forming raw material. Afterward, the body was dried at 80° C. In consequence, the one-side plugged honeycomb formed body with the non-fired collecting layer was obtained.

Next, open frontal areas of cells of the other end surface (the outflow-side end surface) of the honeycomb formed body (the one-side plugged honeycomb formed body with the non-fired collecting layer) were charged with the plugging slurry in the same manner as in the method of forming the plugged portions in the one end surface (the inflow-side end surface) of the honeycomb formed body. In consequence, both the end surfaces of the obtained honeycomb structure had a state where the cell open frontal areas and the plugged portions formed a checkered pattern. Afterward, the honeycomb formed body charged with the plugging slurry was dried. In consequence, the honeycomb formed body with the non-fired collecting layer was obtained.

Next, the honeycomb formed body with the non-fired collecting layer was heated at 450° C. for five hours, and degreased. Furthermore, the formed body was fired by heating the body at 1425° C. for seven hours, to obtain a honeycomb structure.

Figure 11:
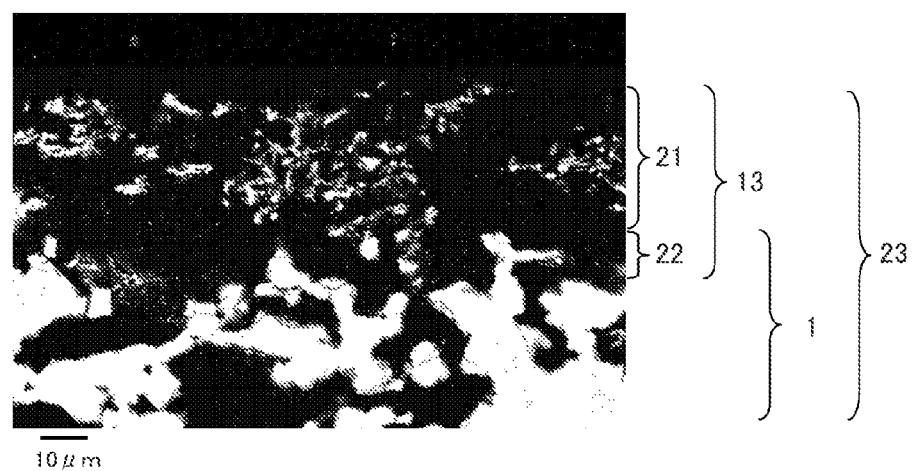
FIG. 11 is a scanning type electron microscope (SEM) photograph of "a cross section of a partition wall which is orthogonal to the cell extending direction" in a state where pores of partition walls (a partition wall parent material and a collecting layer) of the honeycomb structure are filled with a resin (an epoxy resin).

As to the obtained honeycomb structure, by the following methods, there were evaluated "a pore surface area ratio (the pore surface area per unit volume of the collecting layer with respect to the pore surface area per unit volume of the partition wall parent material (the collecting layer/the partition wall parent material))", "a thickness of a penetrating portion of the collecting layer/a partition wall thickness (the thickness of the portion of the collecting layer which penetrated into the pores of the partition wall parent material/the thickness of the partition wall including the partition wall parent material and the collecting layer) (%)", "the pore surface area of the partition walls (the pore surface area per unit volume of the partition wall parent material) (m$^2$/cm$^3$)", "a porosity (%) of a surface layer", "a thickness of the surface layer/the partition wall thickness (%)", "an average pore diameter (μm) of the partition wall parent material", "a porosity (%) of the partition wall parent material", "an initial pressure loss (kPa)" and "200 nm or smaller PM initial collecting efficiency (the initial collecting efficiency of an object which was a PM having particle diameters of 200 nm or smaller) (%)". The results are shown in Table 1. FIG. 11 shows a scanning type electron microscope (SEM) image of "a cross section of a partition wall which is orthogonal to a cell extending direction" in a state where pores of partition walls (a partition wall parent material and a collecting layer) of the honeycomb structure are filled with a resin (an epoxy resin). It is seen from FIG. 11 that a partition wall 23 of the honeycomb structure is constituted of a collecting layer 13 including a surface layer 21 and a deep layer 22, and a partition wall parent material 1. It is to be noted that the SEM image of FIG. 11 is different from an SEM image for obtaining "the pore surface area ratio" and the like.

(Pore Surface Area Ratio)

"The pore surface area per unit volume" of the partition wall parent material and the collecting layer was obtained by the following method. First, the honeycomb structure is buried in a resin (an epoxy resin) to fill pores of the partition walls of the honeycomb structure with the resin, thereby acquiring a scanning type electron microscope (SEM) image of a cross section of the honeycomb structure in a vertical direction to a cell longitudinal direction (not shown). The SEM image is an image having a magnification of 5000 times and 960×1280 pixels. A partition wall in the obtained SEM image is divided by a width of 5 µm from a partition wall center (the center in a thickness direction) to a surface layer in the image (by image analysis), and each "divided part (divided region)" is subjected to the following processing. A peripheral length of the surface of each partition wall and an area of each partition wall of each divided part are measured by using image analysis software (Image-Pro Plus 6.2J manufactured by Media Cybernetics Co.). "The peripheral length/the area" is the pore surface area per unit volume. Here, "the peripheral length" is a length obtained by distinguishing a portion where the material is present and a portion (the pore) where the material is not present in each "divided part", and adding up all the lengths of boundary lines between the portions where the material is present and the pores. The pore surface area per unit volume of the divided part closest to the surface is the pore surface area per unit volume of the collecting layer, and the pore surface area per unit volume of the divided part of the partition wall center is the pore surface area per unit volume of the partition wall parent material.

(Thickness of Penetrating Portion of Collecting Layer/Partition Wall Thickness)

The pores of the partition walls (the partition wall parent material and the collecting layer) of the honeycomb structure are filled with the resin (the epoxy resin), to acquire a scanning type electron microscope (SEM) image of a cross section of the honeycomb structure which is orthogonal to a cell extending direction. The SEM image is an image having a magnification of 5000 times and 960×1280 pixels. From the scanning type electron microscope (SEM) image, the thickness of each of the partition walls is measured. Moreover, a partition wall in the obtained SEM image is divided by a width of 5 µm from the partition wall center (the center in the thickness direction) to the surface layer in the image (by the image analysis). For each "divided part (divided region)", a peripheral length and an area of the partition wall parent material are measured by using the image analysis software (Image-Pro Plus 6.2J manufactured by Media Cybernetics Co.). "The peripheral length/the area" is the pore surface area of the divided part. Here, "the peripheral length" is a length obtained by distinguishing a portion where the material is present and a portion (the pore) where the material is not present in each "divided part", and adding up all the lengths of boundary lines between the portions where the material is present and the pores. The pore surface area per unit volume of the divided part closest to the surface of the collecting layer is "the pore surface area of the collecting layer (the surface layer)". Moreover, the pore surface area per unit volume of the divided part closest to the center of the partition wall is the pore surface area of the partition wall parent material (the region where the only partition wall parent material is present).

Moreover, in a "depth-pore surface area" coordinate shown in FIG. 3, a straight line α indicating that a value of a "pore surface area" axis (y-axis) is a value of "the pore surface area of the surface layer 21" and a straight line β indicating that the value of the "pore surface area" axis (y-axis) is a value of "the pore surface area of the region where the only partition wall parent material 1 is present" are drawn in parallel with a "depth" axis x-axis). Furthermore, "a plurality of measured values of the pore surface areas" of a portion where the deep layer 22 and the partition wall parent material 1 are mixed (the divided part) are linearly approximated (a minimum square process), to draw a straight line γ in a "depth-pore surface area" coordinate system. Then, "a depth" of an intersection between the line α indicating the above "pore surface area of the surface layer 21" and the line γ indicating "the pore surface area of the portion where the deep layer 22 and the partition wall parent material 1 are mixed" is a depth D1 of "a boundary portion between the surface layer 21 of the collecting layer 13 and the deep layer 22 of the collecting layer 13". "A depth" of an intersection between the line β indicating the above "pore surface area of the region where the only partition wall parent material 1 is present" and the line γ indicating "the pore surface area of the portion where the deep layer 22 and the partition wall parent material 1 are mixed" is a depth D2 of "a boundary portion between a region where the deep layer 22 of the collecting layer 13 and the partition wall parent material 1 are mixed and the region where the only partition wall parent material 1 is present". It is to be noted that the depth D1 becomes the thickness of the surface layer 21.

A value obtained by subtracting a depth D1 of "a boundary portion between the surface layer 21 of the collecting layer 13 and the deep layer 22 of the collecting layer 13" from a depth D2 of "a boundary portion between a region where the deep layer 22 of the collecting layer 13 and the partition wall parent material 1 are mixed and a region where the only partition wall parent material 1 is present" is a thickness of the deep layer 22 of the collecting layer 13 (the thickness of a penetrating portion of the collecting layer). Moreover, a value obtained by dividing "the thickness of the penetrating portion of the collecting layer" by "the thickness of each partition wall" and multiplying the resultant value by 100 is a value of "the thickness of the penetrating portion of the collecting layer/the partition wall thickness (%)".

(Pore Surface Area of Partition Walls)

The pore surface area of the partition walls is a value obtained by multiplying "a specific surface area" by "a density". The specific surface area is measured by using a flow type specific surface area automatic measuring apparatus (trade name: Flow Sorb manufactured by Micromeritics Co.). As a measurement gas, krypton is used. The density is measured by using a dry type automatic densimeter (trade name: Accupyc manufactured by Micromeritics Co.). As a measuring gas, helium is used.

(Porosity of Surface Area)

In the "the SEM image of the partition wall" used in measuring "the thickness of the penetrating portion of the collecting layer/the partition wall thickness", a ratio of "the whole area of the pores in the surface layer" to "the whole area of the surface layer" is calculated to obtain "the porosity of the surface layer (%)".

(Thickness of Surface Layer/Partition Wall Thickness)

"The thickness of the surface layer/the partition wall thickness (%)" is calculated from "the partition wall thickness" and "the thickness (D1) of the surface layer" measured in the above "the thickness of the penetrating portion of the collecting layer/the partition wall thickness".

(Average Pore Diameter of Partition Wall Parent Material)

The collecting layer is removed from the partition walls of the honeycomb structure, and an average pore diameter (µm)

is measured by mercury porosimetry by use of Auto Pore IV9520 (trade name) manufactured by Shimadzu Corp.

(Porosity of Partition Wall Parent Material)

The collecting layer is removed from the partition walls of the honeycomb structure, and the porosity (%) is measured by the mercury porosimetry by use of Auto Pore IV9520 (trade name) manufactured by Shimadzu Corp.

(Initial Pressure Loss)

A partition wall is cut out from each of "the dried honeycomb formed bodies" prepared on the same conditions as in examples and comparative examples so that it is possible to acquire an evaluation region of 10 mm×10 mm or larger and 50 mm×50 mm or smaller. Then, one surface of the cutout partition wall is coated with each of collecting layer forming raw materials prepared on the same conditions as in the examples and comparative examples. Afterward, drying, degreasing and firing are performed on the same conditions as in Example 1, to obtain a sample for evaluation. The obtained evaluation sample is installed in "a PM collecting efficiency measuring apparatus" so that the surface of the collecting layer (the surface layer) becomes "a gas inflow-side surface".

The PM collecting efficiency measuring apparatus includes a main body to which the evaluation sample is attached, a PM generating device is disposed on an upstream side of the main body, and the apparatus is configured to supply, to the main body, a PM generated by this PM generating device. The evaluation sample is attached so as to divide (partition) the interior of the main body into the upstream side and a downstream side. Moreover, in the main body, measuring holes are made in the evaluation sample on the upstream side and the downstream side. Pressures on the upstream and downstream sides of the evaluation sample can be measured through the measuring holes, respectively. Moreover, in the main body, an inlet PM measuring section is attached to the upstream side of the evaluation sample, and an outlet PM measuring section is attached to the downstream side of the evaluation sample.

When an initial pressure loss (kPa) is measured, air is supplied to the main body in a state where the PM is not generated. Specifically, the air which does not contain the PM is supplied to the main body, and passed through the evaluation sample. At this time, a flow velocity (a permeation flow velocity) when the air which does not contain the PM permeates the evaluation sample is adjusted to obtain a value in a range of 30 cm/second or higher and 2 m/second or lower. Then, a difference between the pressure measured through the upstream-side measuring hole and the pressure measured through the downstream-side measuring hole is the initial pressure loss.

(200 nm or Smaller PM Initial Collecting Efficiency)

Figure 10:
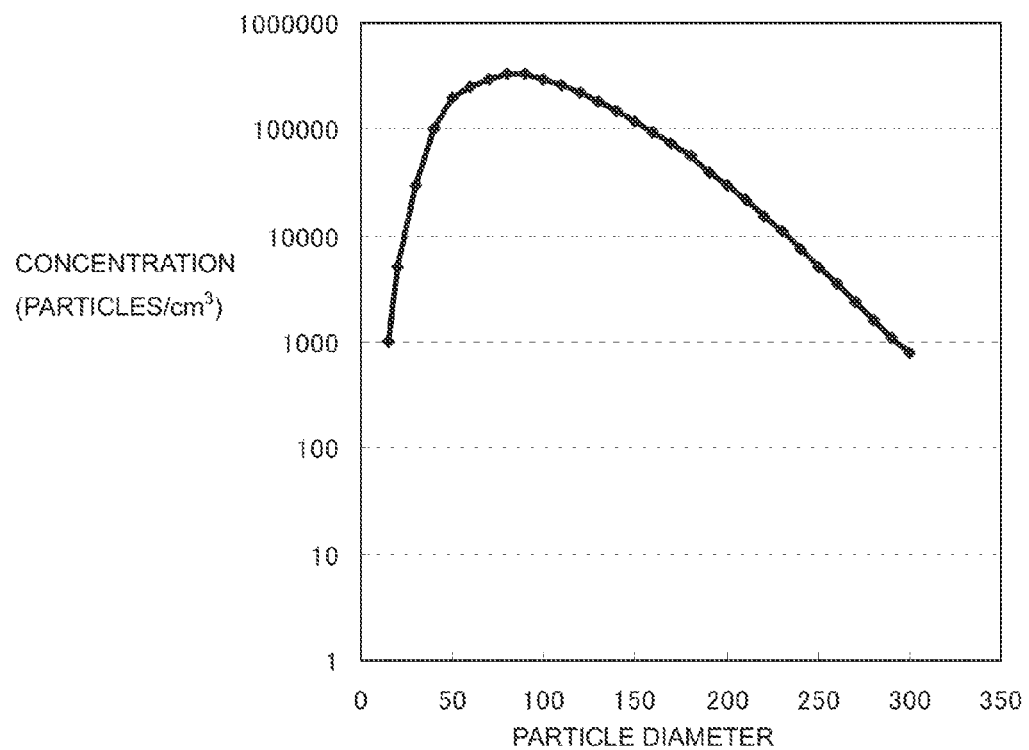
FIG. 10 is a graph showing a PM particle size distribution measured by an inlet PM measuring section of a PM collecting efficiency measuring apparatus.

In the same manner as in the above measurement of "the initial pressure loss", PM-containing air permeates through the evaluation sample by use of "the PM collecting efficiency measuring apparatus". Then, an amount (an integrated value) of the PM is measured in the inlet PM measuring section and the outlet PM measuring section for 150 seconds after the PM starts to be deposited in the evaluation sample. Here, when the amount is measured in the inlet PM measuring section and the outlet PM measuring section, the only PM having particle diameters of 200 nm or smaller is a measurement object. Then, a ratio of the PM amount (the integrated value) measured in the outlet PM measuring section to the PM amount (the integrated value) measured in the inlet PM measuring section is calculated, and a value obtained by subtracting the obtained value from 1 is "the 200 nm or smaller PM initial collecting efficiency". It is to be noted that a particle size distribution of the PM measured in the inlet PM measuring section was a distribution shown in FIG. 10. FIG. 10 is a graph showing the particle size distribution of the PM measured in the inlet PM measurement section of the PM collecting efficiency measuring apparatus.

TABLE 1

|  | Example 1 | Example 2 | Example 3 | Example 4 | Example 5 | Example 6 | Example 7 |
|---|---|---|---|---|---|---|---|
| Material of partition wall parent material | Cordierite | Cordierite | Cordierite | Cordierite | Cordierite | Cordierite | Cordierite |
| Material of collecting layer | Alumina | Alumina | Alumina | Alumina | Alumina | Alumina | Alumina |
| Pore surface area ratio (collecting layer/partition wall parent material) | 21.5 | 46.2 | 2.5 | 33.8 | 9.2 | 46.2 | 2.5 |
| Thickness of penetrating portion of collecting layer/partition wall thickness | 2.8% | 5.6% | 0.6% | 3.7% | 0.6% | 4.8% | 0.6% |
| Pore surface area of partition wall ($m^2/cm^3$) | 4.0 | 25.1 | 1.3 | 19.0 | 1.5 | 16.2 | 1.4 |
| Porosity of surface layer | 70% | 54% | 78% | 52% | 75% | 54% | 78% |
| Thickness of surface layer/partition wall thickness | 16.7% | 44.4% | 3.2% | 44.4% | 3.2% | 28.6% | 6.3% |
| Ave. pore dia. of partition wall parent material | 12 μm | 12 μm | 12 μm | 12 μm | 12 μm | 12 μm | 12 μm |
| Porosity of partition wall parent material | 46% | 46% | 46% | 46% | 46% | 46% | 46% |
| Initial pressure loss (kPa) | 2.0 | 10.0 | 0.8 | 6.0 | 1.2 | 5.0 | 1.2 |
| 200 nm or smaller PM initial collecting efficiency | 89% | 98% | 68% | 98% | 81% | 96% | 75% |

Examples 2 to 7 and 9 to 17

In the same manner as in Example 1, honeycomb formed bodies were prepared and dried. Then, collecting layer forming raw materials were prepared on conditions shown in Table 5. Afterward, honeycomb structures were obtained in the same manner as in Example 1. Here, as "polystyrene sulfonate" of "viscosity regulator" of Table 5, Chemistat SA-136 (trade name) manufactured by Sanyo Chemical Co. was used. Moreover, A-60 (trade name) manufactured by Kao Corp. was used as "polyoxyethylene distyrenated phenyl ether". Moreover, "cellulose" was a micro cellulose fiber (trade name: Celish manufactured by Daicel Corp.) having an average fiber diameter (a length of a short diameter) of 0.1 μm. This micro cellulose fiber (the micro organic fiber) is insoluble in water. Evaluations were performed in the same manner as in Example 1. Moreover, "a volume percentage of (1)+(2)" in Table 5 means a percentage of a total of a volume of the ceramic raw material for the collecting layer and a volume of a pore former to the whole volume of the collecting layer forming raw material. The results are shown in Tables 1 to 3.

TABLE 2

|  | Example 8 | Example 9 | Example 10 | Example 17 | Comparative Example 1 | Comparative Example 2 |
|---|---|---|---|---|---|---|
| Material of partition wall parent material | Cordierite | Cordierite | Cordierite | Cordierite | Cordierite | Cordierite |
| Material of collecting layer | Alumina | Mullite | Spinel | Alumina | Alumina | Alumina |
| Pore surface area ratio (collecting layer/partition wall parent material) | 21.5 | 3.5 | 3.6 | 2.5 | 46.2 | 1.8 |
| Thickness of penetrating portion of collecting layer/partition wall thickness | 2.8% | 2.8% | 2.8% | 0.6% | 11.1% | 0.6% |
| Pore surface area of partition wall ($m^2/cm^3$) | 4.6 | 1.6 | 1.7 | 1.4 | 25.1 | 1.3 |
| Porosity of surface layer | 70% | 68% | 65% | 78% | 54% | 82% |
| Thickness of surface layer/partition wall thickness | 16.7% | 16.7% | 16.7% | 16.7% | 44.4% | 3.2% |
| Ave. pore dia. of partition wall parent material | 54 μm | 12 μm | 12 μm | 12 μm | 12 μm | 12 μm |
| Porosity of partition wall parent material | 58% | 46% | 46% | 46% | 46% | 46% |
| Initial pressure loss (kPa) | 1.0 | 1.4 | 1.3 | 1.2 | 12 | 0.6 |
| 200 nm or smaller PM initial collecting efficiency | 88% | 84% | 83% | 78% | 98% | 45% |

TABLE 3

|  | Example 11 | Example 12 | Example 13 | Example 14 | Example 15 | Example 16 |
|---|---|---|---|---|---|---|
| Material of partition wall parent material | Cordierite | Cordierite | Cordierite | Cordierite | Cordierite | Cordierite |
| Material of collecting layer | Alumina, Spinel | Alumina, Spinel | Alumina | Alumina | Alumina | Alumina, Spinel |
| Pore surface area ratio (collecting layer/partition wall parent material) | 20.5 | 20.5 | 21.5 | 21.5 | 21.5 | 20.5 |
| Thickness of penetrating portion of collecting layer/partition wall thickness | 4.4% | 2.8% | 4.4% | 3.3% | 2.8% | 2.2% |
| Pore surface area of partition wall ($m^2/cm^3$) | 4.1 | 4.2 | 3.9 | 4.0 | 4.0 | 4.3 |
| Porosity of surface layer | 63% | 63% | 70% | 70% | 70% | 61% |
| Thickness of surface layer/partition wall thickness | 16.7% | 16.7% | 16.7% | 16.7% | 16.7% | 16.7% |
| Ave. pore dia. of partition wall parent material | 12 μm | 12 μm | 12 μm | 12 μm | 12 μm | 12 μm |
| Porosity of partition wall parent material | 46% | 46% | 46% | 46% | 46% | 46% |
| Initial pressure loss (kPa) | 2.0 | 2.1 | 1.8 | 2.1 | 2.0 | 2.2 |
| 200 nm or smaller PM initial collecting efficiency | 88% | 90% | 88% | 88% | 88% | 90% |

TABLE 4

|  | Comparative Example 3 | Comparative Example 4 | Comparative Example 5 | Comparative Example 6 |
|---|---|---|---|---|
| Material of partition wall parent material | Cordierite | Cordierite | Cordierite | Cordierite |
| Material of collecting layer | Alumina, Spinel | Alumina | Alumina | Alumina |
| Pore surface area ratio (collecting layer/partition wall parent material) | 20.5 | 21.5 | 21.5 | 21.5 |
| Thickness of penetrating portion of collecting layer/partition wall thickness | 7.8% | 6.7% | 6.1% | 8.3% |
| Pore surface area of partition wall ($m^2/cm^3$) | 3.2 | 3.6 | 3.8 | 3.1 |
| Porosity of surface layer | 62% | 70% | 70% | 65% |
| Thickness of surface layer/partition wall thickness | 16.7% | 16.7% | 16.7% | 16.7% |
| Ave. pore dia. of partition wall parent material | 12 μm | 12 μm | 12 μm | 12 μm |
| Porosity of partition wall parent material | 46% | 46% | 46% | 46% |
| Initial pressure loss (kPa) | Could not be evaluated owing to deformation | | | |
| 200 nm or smaller PM initial collecting efficiency | | | | |

TABLE 5

| | (1) Ceramic raw material for collecting layer | | (2) Pore former | | Viscosity regulator | | Electrolyte | | Water | Electrolyte solubility (%) | Volume percent. of (1) + (2) (%) |
|---|---|---|---|---|---|---|---|---|---|---|---|
| | Type | Specific surface area (m²/g) | Mass (g) | Average particle dia. (μm) | Mass (g) | Type | Mass (g) | Type | Mass (g) | Mass (g) | | |
| Example 1 | Alumina particles | 7 | 150 | 5 | 110 | Polystyrene sulfonate | 2 | Citric acid | 384 | 286 | 93 | 20 |
| Example 2 | Alumina particles | 15 | 480 | 5 | 60 | Polystyrene sulfonate | 2 | Citric acid | 384 | 286 | 93 | 25 |
| Example 3 | Alumina particles | 0.8 | 70 | 5 | 50 | Polystyrene sulfonate | 2 | Citric acid | 384 | 286 | 93 | 10 |
| Example 4 | Alumina particles | 11 | 480 | 5 | 60 | Polystyrene sulfonate | 2 | Citric acid | 384 | 286 | 93 | 25 |
| Example 5 | Alumina particles | 3 | 90 | 5 | 40 | Polystyrene sulfonate | 2 | Citric acid | 384 | 286 | 93 | 10 |
| Example 6 | Alumina particles | 15 | 360 | 5 | 45 | Polystyrene sulfonate | 2 | Citric acid | 384 | 286 | 93 | 20 |
| Example 7 | Alumina particles | 0.8 | 110 | 5 | 75 | Polystyrene sulfonate | 2 | Citric acid | 384 | 286 | 93 | 15 |
| Example 8 | Alumina particles | 7 | 150 | 5 | 110 | Polystyrene sulfonate | 2 | Citric acid | 384 | 286 | 93 | 20 |
| Example 9 | Mullite particles | 1.5 | 150 | 5 | 90 | Polystyrene sulfonate | 2 | Citric acid | 384 | 286 | 93 | 20 |
| Example 10 | Spinel particles | 1.3 | 180 | 5 | 90 | Polystyrene sulfonate | 2 | Citric acid | 384 | 286 | 93 | 20 |
| Example 11 | Alumina particles | 7 | 150 | 5 | 110 | Polyoxyethylene distyrenated phenyl ether | 2 | Magnesium acetate | 123 | 432 | 50 | 20 |
| Example 12 | Alumina particles | 7 | 150 | 5 | 110 | Polyoxyethylene distyrenated phenyl ether | 2 | Magnesium acetate | 143 | 418 | 60 | 20 |
| Example 13 | Alumina particles | 7 | 150 | 5 | 110 | Polyoxyethylene distyrenated phenyl ether | 2 | Ammonium acetate | 124 | 401 | 83 | 20 |
| Example 14 | Alumina particles | 7 | 150 | 5 | 110 | Polystyrene sulfonate | 2 | Citric acid | 294 | 340 | 60 | 20 |
| Example 15 | Alumina particles | 7 | 150 | 5 | 110 | Polystyrene sulfonate | 2 | Citric acid | 315 | 328 | 67 | 20 |
| Example 16 | Alumina particles | 7 | 150 | 5 | 110 | Polyoxyethylene distyrenated phenyl ether | 2 | Magnesium chloride | 131 | 460 | 52 | 20 |
| Example 17 | Alumina particles | 0.8 | 70 | 5 | 50 | Cellulose | 3 | Citric acid | 384 | 286 | 93 | 10 |
| Comparative Example 1 | Alumina particles | 15 | 480 | 5 | 60 | Polystyrene sulfonate | 2 | Citric acid | 384 | 286 | 93 | 25 |
| Comparative Example 2 | Alumina particles | 0.6 | 30 | 5 | 20 | Polystyrene sulfonate | 2 | Citric acid | 384 | 286 | 93 | 5 |
| Comparative Example 3 | Alumina particles | 7 | 150 | 5 | 110 | Polyoxyethylene distyrenated phenyl ether | 2 | Magnesium acetate | 102 | 447 | 40 | 20 |
| Comparative Example 4 | Alumina particles | 7 | 150 | 5 | 110 | Polyoxyethylene distyrenated phenyl ether | 2 | Ammonium acetate | 98 | 425 | 63 | 20 |
| Comparative Example 5 | Alumina particles | 7 | 150 | 5 | 110 | Polystyrene sulfonate | 2 | Citric acid | 260 | 361 | 50 | 20 |
| Comparative Example 6 | Alumina particles | 7 | 150 | 5 | 110 | Polyoxyethylene distyrenated phenyl ether | 2 | Aluminum sulfate | 157 | 459 | 91 | 20 |

Example 8

A honeycomb structure was prepared in the same manner as in Example 1 except that PMMA having an average particle diameter of 60 μm was further added to a ceramic forming raw material. It is to be noted that a content of PMMA in the ceramic forming raw material was 10 mass %. Evaluations were performed in the same manner as in Example 1. The results are shown in Table 2.

Comparative Example 1

In the same manner as in Example 1, a honeycomb formed body was prepared and dried. Afterward, the dried honeycomb formed body was heated at 450° C. for five hours to degrease the formed body, and further heated at 1425° C. for 7 hours to fire the formed body, thereby obtaining "a fired honeycomb structure". "The fired honeycomb structure" was dip-coated with a collecting layer forming raw material in the same manner as in Example 1 except that "the fired honeycomb structure" was used in place of "the dried honeycomb formed body" and the collecting layer forming raw material was prepared on conditions shown in Table 5. Afterward, the structure was dried at 80° C. and fired at 1200° C. to obtain a honeycomb structure. As to the obtained honeycomb structure, evaluations were performed in the same manner as in Example 1. The results are shown in Tables 2 and 4.

Comparative Examples 2 to 6

In the same manner as in Example 1, honeycomb formed bodies were prepared and dried. Then, collecting layer forming raw materials were prepared on conditions shown in Table 5. Afterward, honeycomb structures were obtained in the same manner as in Example 1. As to the obtained honeycomb structures, evaluations were performed in the same manner as in Example 1. The results are shown in Tables 2 and 4.

To confirm strengths of the honeycomb structures of Examples 11 to 16 and Comparative Examples 3 to 6, "dried ceramic formed bodies" were prepared by use of "ceramic forming raw materials" and "electrolytes and water in collecting layer forming raw materials" used in Examples 11 to 16 and Comparative Examples 3 to 6. As to "the dried ceramic formed bodies", "a bend test" and "a deformation test" were carried out by the following methods. The results are shown in Table 6.

(Bend Test)

A kneaded material is prepared in the same manner as in the manufacturing methods of the examples and comparative examples by use of the ceramic forming raw materials used in the examples and comparative examples. The obtained kneaded material is extruded by using a vacuum extrusion-forming machine, to obtain a plate-like ceramic formed body having a thickness of 3 mm, a width of 50 mm and a length of 100 mm. The ceramic formed body was dried at 80° C., to cut out "a sample" having a size of 3 mm×4 mm×40 mm from the dried ceramic formed body. The cutout sample was immersed into the following solution for 40 minutes, and then a four-point bend test (JIS-R1601) was carried out. The above "solution" into which "the sample" was immersed was prepared by mixing the electrolyte and water in a collecting layer forming raw material used in each of the examples and comparative examples so as to obtain the same solubility as that in each of the examples and comparative examples. In the obtained "stress-strain curve", a stress value when a value of strain is 0.2% is "a bend stress". When this stress value is 0.4 MPa or larger and the honeycomb formed body is dip-coated with the collecting layer forming raw material during the manufacturing of the honeycomb structure, the honeycomb formed body can resist a stress applied at the time of the dip-coating. It is possible to suppress the deformation of the honeycomb formed body.

(Deformation Test)

A one-side plugged honeycomb formed body is mounted on a 6-mesh stainless steel mesh having an area of about 90% of an area of an end surface of the one-side plugged honeycomb formed body so that an end surface 61 on an inflow side of a fluid comes in contact with the stainless steel mesh. The one-side plugged honeycomb formed body mounted on the stainless steel mesh is immersed into a container in which a collecting layer forming raw material is placed, to dip-coat the one-side plugged honeycomb formed body with the collecting layer forming raw material. Afterward, the one-side plugged honeycomb formed body is removed from the container. When the one-side plugged honeycomb formed body is immersed into the container in which the collecting layer forming raw material is placed and the formed body is removed from the container, the end surface of the one-side plugged honeycomb formed body receives a stress from the stainless steel mesh owing to a mass of the coated collecting layer forming raw material and a self-weight of the one-side plugged honeycomb formed body. Afterward, the one-side plugged honeycomb formed body is dried. After the drying, the end surface of the one-side plugged honeycomb formed body which came in contact with the stainless steel mesh is observed. Then, it is judged whether or not there is a deformation (pattern) along meshes in the one-side plugged honeycomb formed body. "Nil" in a column of "deformation" of Table 6 indicates that there are not any deformations. "Present" in the column of "deformation" of Table 6 indicates that the formed body is deformed.

TABLE 6

| | Electrolyte | | Solubility | Bend stress | Defor- |
| --- | --- | --- | --- | --- | --- |
| | Anion | Cation | (%) | (MPa) | mation |
| Example 11 | Acetic acid | Magnesium | 50 | 0.40 | Nil |
| Example 12 | Acetic acid | Magnesium | 60 | 0.60 | Nil |
| Example 13 | Acetic acid | Ammonium | 83 | 0.40 | Nil |
| Example 14 | Citric acid | Hydrogen | 60 | 0.45 | Nil |
| Example 15 | Citric acid | Hydrogen | 67 | 0.52 | Nil |

TABLE 6-continued

| | Electrolyte | | Solubility | Bend stress | Defor- |
| --- | --- | --- | --- | --- | --- |
| | Anion | Cation | (%) | (MPa) | mation |
| Example 16 | Chlorine | Magnesium | 52 | 0.81 | Nil |
| Comparative Example 3 | Acetic acid | Magnesium | 40 | 0.25 | Present |
| Comparative Example 4 | Acetic acid | Ammonium | 63 | 0.30 | Present |
| Comparative Example 5 | Citric acid | Hydrogen | 50 | 0.35 | Present |
| Comparative Example 6 | Sulfuric acid | Aluminum | 91 | 0.12 | Present |

It is seen from Tables 1 and 2 that when the pore surface area ratio (the collecting layer/the partition wall parent material) is larger than 2.0, the PM initial collecting efficiency is high. It is also seen that when "the thickness of the penetrating portion of the collecting layer/the partition wall thickness" is 6% or smaller, the initial pressure loss is small. It is further seen from Table 6 that when the solubility of the electrolyte is 50% or larger of the saturated solubility, the bend stress is large and the sample is not deformed in the bend test.

Industrial Applicability

A honeycomb structure of the present invention can suitably be utilized as a filter to purify gases discharged from an internal combustion engine such as a diesel engine, various types of combustion apparatuses and the like. Moreover, a manufacturing method of a honeycomb structure of the present invention can suitably be utilized in manufacturing such a honeycomb structure.

Description of Reference Signs

1: partition wall parent material, 2: cell, 2a: inflow cell, 2b: outflow cell, 3: outer peripheral wall, 4: honeycomb base material, 5: plugged portion, 11: inflow-side end surface, 12: outflow-side end surface, 13: collecting layer, 21: surface layer, 22: deep layer, 23: partition wall, 50: honeycomb formed body, 51: non-fired partition wall parent material, 52: cell, 52a: inflow cell, 52b: outflow cell, 53: outer peripheral wall, 55: plugged portion, 60: one-side plugged honeycomb formed body, 61: inflow-side end surface, 62: outflow-side end surface, 63: non-fired collecting layer, 70: one-side plugged honeycomb formed body with non-fired collecting layer, 75: honeycomb formed body with non-fired collecting layer, 100: honeycomb structure, α, β and γ: straight line, and D1 and D2: depth.

What is claimed is:

1. A honeycomb structure comprising:
   a honeycomb base material including a porous partition wall parent material to partition and form a plurality of cells which become through channels of a fluid;
      plugged portions arranged in open frontal areas of predetermined cells in an end surface on an inflow side of the fluid and open frontal areas of the remaining cells in an end surface on an outflow side of the fluid; and
   a porous collecting layer disposed on the surface of the partition wall parent material in the remaining cells,
   wherein a melting point of a material constituting the collecting layer is higher than that of a material constituting the partition wall parent material,
   a pore surface area per unit volume of the collecting layer is 2.0 times or more a pore surface area per unit volume of the partition wall parent material,
   wherein a thickness of the partition wall parent material is from 100 μm to 350 μm, wherein a thickness of the collecting layer formed on the partition wall parent material is from 5 to 17% of that of the sum of the thickness of the partition wall parent material and the thickness of the collecting layer disposed on the partition wall parent material, a thickness of a portion of the collecting layer which penetrates into pores of the partition wall parent material is 0.1% or larger and 3% or smaller of that of each of partition walls including the partition wall parent material and the collecting layer, and wherein the collecting layer is formed by coating the partition wall parent material in an unfired state with a raw material that forms the collecting layer, and then firing.

2. The honeycomb structure according to claim 1, wherein the pore surface area per unit volume of the partition walls is from 1.4 to 20 $m^2/cm^3$.

3. The honeycomb structure according to claim 1, wherein a porosity of a portion of the collecting layer which does not penetrate into the pores of the partition wall parent material is 60% or larger.

4. The honeycomb structure according to claim 2, wherein a porosity of a portion of the collecting layer which does not penetrate into the pores of the partition wall parent material is 60% or larger.

5. The honeycomb structure according to claim 1, wherein the partition wall parent material has an average pore diameter of 10 to 60 μm, and a porosity of 40 to 70%.

6. The honeycomb structure according to claim 2, wherein the partition wall parent material has an average pore diameter of 10 to 60 gin, and a porosity of 40 to 70%.

7. The honeycomb structure according to claim 1, wherein the material of the partition wall parent material is cordierite, and the material of the collecting layer includes at least one selected from the group consisting of alumina, mullite and spinel.

8. The honeycomb structure according to claim 6, wherein the material of the partition wall parent material is cordierite, and the material of the collecting layer includes at least one selected from the group consisting of alumina, mullite and spinel.

* * * * *